(12) United States Patent
Gusman et al.

(10) Patent No.: US 12,420,936 B2
(45) Date of Patent: Sep. 23, 2025

(54) AERODYNAMIC LIFTING STRUCTURES HAVING EMBEDDED ENGINES, AND ASSOCIATED SYSTEMS AND METHODS

(71) Applicant: Cosmic Aerospace, Inc., Centennial, CO (US)

(72) Inventors: Marshall Royd Gusman, Centennial, CO (US); Christopher Chahine, Bierbeek (BE); Joseph Ray Wilding, Castle Rock, CO (US)

(73) Assignee: COSMIC AEROSPACE, INC., Centennial, CO (US)

( * ) Notice: Subject to any disclaimer, the term of this patent is extended or adjusted under 35 U.S.C. 154(b) by 0 days.

(21) Appl. No.: 18/661,438

(22) Filed: May 10, 2024

(65) Prior Publication Data

US 2024/0375780 A1  Nov. 14, 2024

Related U.S. Application Data

(60) Provisional application No. 63/501,622, filed on May 11, 2023.

(51) Int. Cl.
  *B64D 27/31*  (2024.01)
  *B64C 3/18*  (2006.01)
  *B64C 9/14*  (2006.01)

(52) U.S. Cl.
  CPC .............. *B64D 27/31* (2024.01); *B64C 3/185* (2013.01); *B64C 3/187* (2013.01); *B64C 9/14* (2013.01)

(58) Field of Classification Search
  CPC .............. B64D 27/31; B64C 3/32; B64C 9/38
  See application file for complete search history.

(56) References Cited

U.S. PATENT DOCUMENTS

| | | | |
|---|---|---|---|
| 2,973,165 A | * | 2/1961 | Macaulay ............. B64C 23/005 244/54 |
| 3,231,038 A | | 1/1966 | Weiland |

(Continued)

FOREIGN PATENT DOCUMENTS

| | | |
|---|---|---|
| DE | 202016000269 | 2/2016 |
| GB | 578837 | 7/1946 |
| GB | 829753 | 3/1960 |

OTHER PUBLICATIONS

Lilium, Medica Release: Lilium filed 37 new patent applications, https://lilium.com/newsroom-detail/lilium-files-new-patent-applications, accessed May 18, 2022, 4 pages.

(Continued)

*Primary Examiner* — Nicholas McFall
*Assistant Examiner* — Eric Acosta
(74) *Attorney, Agent, or Firm* — Perkins Coie LLP

(57) ABSTRACT

Aerodynamic lifting structures, such as aircraft wings, having embedded engines and associated methods and systems are disclosed herein. A wing assemblies configured in accordance with embodiments of the present technology can include, for example, an upper wing portion, a lower wing portion, and a plurality of independent ducts positioned between the upper wing portion and the lower wing portion. Each duct can extend between a corresponding inlet positioned toward a leading portion of the wing assembly and a corresponding outlet positioned toward a trailing portion of the wing assembly. The wing assembly can further include a plurality of fans and a plurality of electric motors operably coupled to the plurality of fans. The fans and electric motors are positioned in the corresponding individual ducts and the fan is rotatable to propel fluid received in the inlet through the duct to create lift.

56 Claims, 11 Drawing Sheets

(56) References Cited

U.S. PATENT DOCUMENTS

| | | | |
|---|---|---|---|
| 3,330,500 A | | 7/1967 | Winborn |
| 3,774,864 A | | 11/1973 | Hurkamp |
| 4,026,500 A | | 5/1977 | Grow |
| 5,381,986 A | * | 1/1995 | Smith .................. B64C 3/56 244/49 |
| 11,492,099 B2 | * | 11/2022 | Cummings ............ B64D 27/40 |
| 11,597,509 B1 | | 3/2023 | Alfaro |
| 11,866,183 B2 | | 1/2024 | Gonidec et al. |
| 2006/0000943 A1 | | 1/2006 | Ouellette |
| 2016/0311522 A1 | | 10/2016 | Wiegand |
| 2017/0203839 A1 | * | 7/2017 | Giannini ................ B64U 50/19 |
| 2020/0407060 A1 | | 12/2020 | Hosseini |
| 2022/0135204 A1 | | 5/2022 | Mehrgan |
| 2022/0266979 A1 | | 8/2022 | Bansal et al. |
| 2022/0267015 A1 | | 8/2022 | Vermeiren |
| 2022/0275773 A1 | | 9/2022 | Singh et al. |
| 2022/0281594 A1 | | 9/2022 | Martinez |
| 2022/0349361 A1 | | 11/2022 | Moore et al. |
| 2023/0063801 A1 | * | 3/2023 | Courtin ................. B64D 27/24 |
| 2023/0322398 A1 | | 10/2023 | Singh |
| 2024/0002034 A1 | | 1/2024 | Moore et al. |

OTHER PUBLICATIONS

Jet Lilium website: https://jet.lilium.com/, accessed Aug. 31, 2024, 6 pages.

New Atlas, "Whisper Aero claims radical advance in quiet, efficient electric jets," https://newatlas.com/aircraft/whisper-aero-quiet-electric-propulsion/, Jun. 15, 2023, 5 pages.

Cosmic Aerospace, "News: Cosmic secures initial VC funding," https://web.archive.org/web/20231206121157/https://www.cosmicaerospace.com/news/cosmic-establishes-initial-vc-funding, Apr. 4, 2022, 2 pages.

Cosmic Aerospace, "News: Cosmic establishes engine development facility at regional airport in Belgium," https://web.archive.org/web/20231206101809/https://www.cosmicaerospace.com/news/cosmic-establishes-engine-development-facility, Jul. 4, 2022, 2 pages.

Cosmic Aerospace, "News: Cosmic reaches critical power density threshold with first engine prototype," https://web.archive.org/web/20230928184634/https://www.cosmicaerospace.com/news/cosmic-engine-prototype, Mar. 12, 2023, 2 pages.

International Search Report and Written Opinion for International Patent Application No. PCT/US2024/028972, Applicant: Cosmic Aerospace, Inc., mailed Aug. 13, 2024, 19 pages.

* cited by examiner

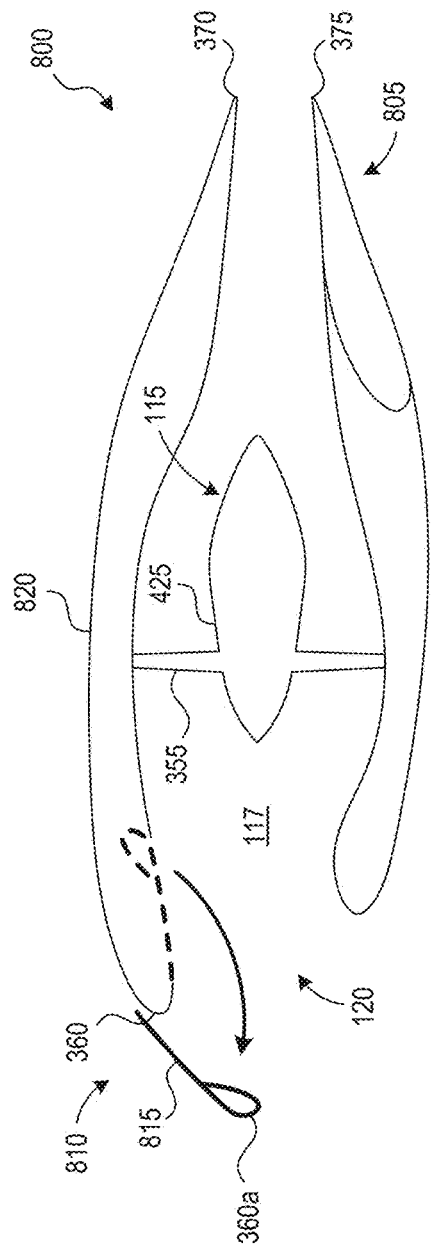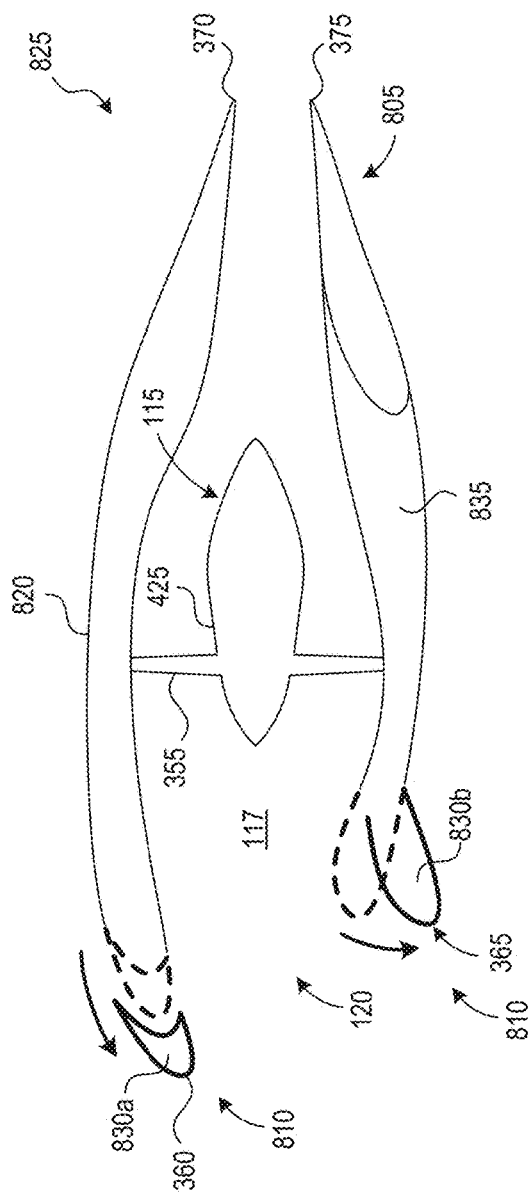
FIG. 8A
FIG. 8B

AERODYNAMIC LIFTING STRUCTURES HAVING EMBEDDED ENGINES, AND ASSOCIATED SYSTEMS AND METHODS

CROSS-REFERENCE TO RELATED APPLICATION(S)

The present application claims priority to U.S. Provisional Patent Application No. 63/501,622, filed May 11, 2023, which is incorporated herein by reference in its entirety.

TECHNICAL FIELD

The present disclosure is directed generally to aerodynamic lifting structures, such as wings for aircraft, having embedded electric engines, and associated systems and methods.

BACKGROUND

Conventional fixed-wing aircraft typically have combustion engines that consume fuel, such as petroleum, for propulsion. For example, most modern commercial aircraft use a turbofan engine, which can include thousands of high precision components in complex arrangements, such as components associated with the fan stage, the compressor stage(s), the combustion chamber, the turbine stage(s), and the nozzle. The combustion engines of such fixed-wing aircraft are typically hung from the wings and/or are carried by a part of the fuselage. These fuel-burning propulsion systems have high temperature exhaust, which limits placement options for the jet turbine systems and surfaces (e.g., aerodynamic control surfaces) downstream of the exhaust, leading to suboptimal aerodynamics and weight. Conventional fuel-burning arrangements also produce air and noise pollution.

To reduce reliance on fossil fuels, some have attempted to retrofit electric propulsion systems into conventional aircraft design, but these attempts still suffer from deficiencies associated with combustion propulsion, such as additional weight without a substantial contribution to lift forces or improvement in aerodynamics. Other prior attempts include VTOL concepts that are not suitable for commercial aircraft intended for passenger travel.

BRIEF DESCRIPTION OF THE DRAWINGS

Many aspects of the present disclosure can be better understood with reference to the following drawings. The components in the drawings are not necessarily to scale. Instead, emphasis is placed on clearly illustrating the principles of the present disclosure. In the drawings, the same reference number indicates the same or similar element throughout the several views.

FIG. 8A is a schematic cross-sectional view of a wing assembly configured in accordance with embodiments of the present technology.

FIG. 8B is a schematic cross-sectional view of a wing assembly configured in accordance with further embodiments of the present technology.

DETAILED DESCRIPTION

Figure 1:
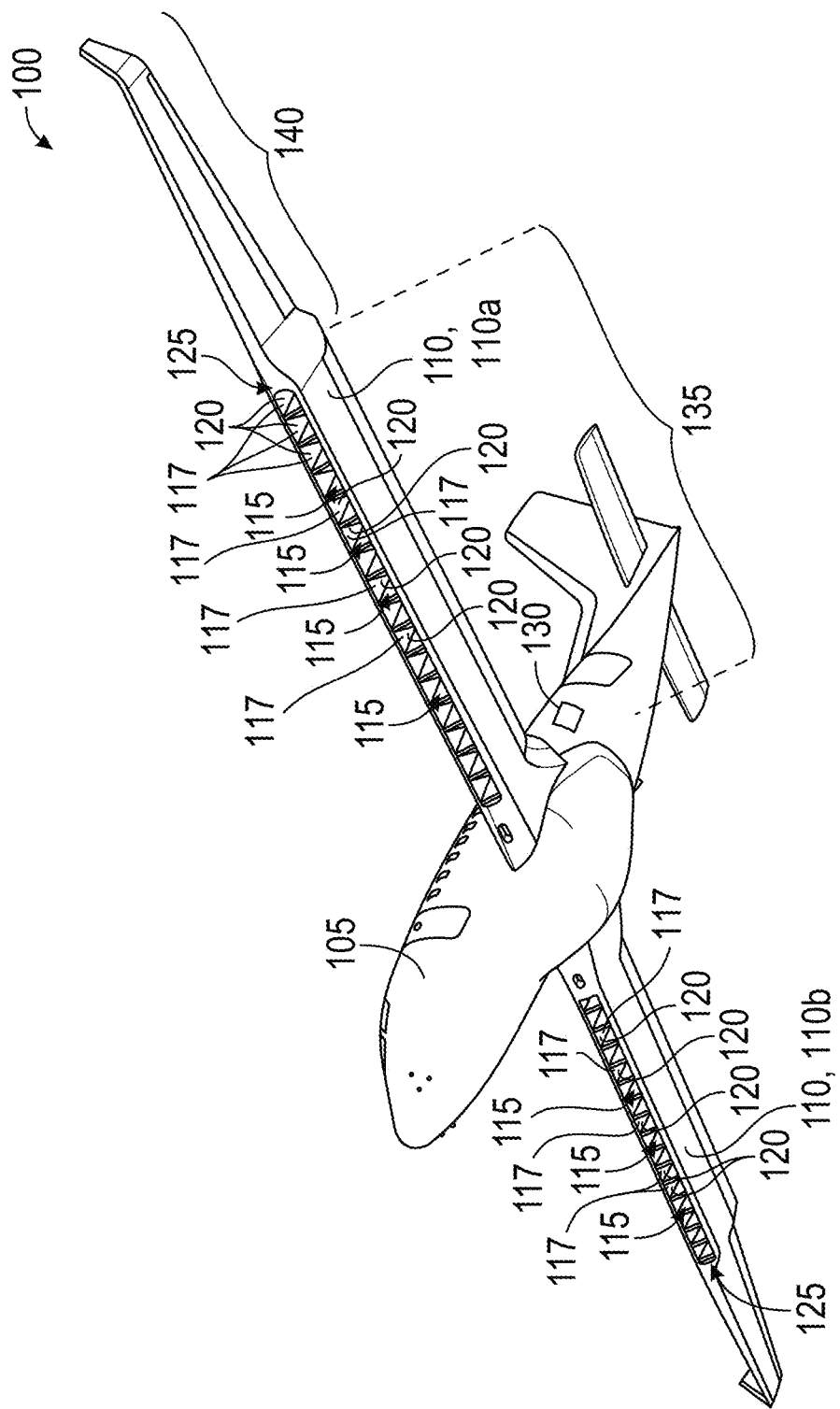
FIG. 1 is a bottom perspective view of an aircraft configured in accordance with embodiments of the present technology.

Aerodynamic lifting structures, such as wings for aircraft, having embedded engines (e.g., electric motors with fans) and associated systems and methods are disclosed herein. In some embodiments, for example, wing assemblies include a plurality of electric engines embedded, integrated, and/or otherwise incorporated within the wing structure itself, such that the wing functions as both the lifting surface (with aerodynamic control surfaces) and the propulsion system. Embodiments disclosed herein can address inefficiencies in conventional aircraft design, including inefficiencies and drawbacks associated with existing aircraft designs that implement combustion engines and/or electric propulsion. Embodiments of the present technology overcome a tradeoff that is typically made in conventional aircraft design, in which a conventional aircraft designer may design for overall aircraft performance at the expense of losses in structural and aerodynamic efficiency. For example, in contrast with prior technologies that suspend large combustion-based propulsion systems from a wing, the present technology embeds relatively smaller engines in the wing structure itself, which improves (e.g., optimizes) aerodynamics, weight, and structural efficiency. Several embodiments of the present technology are directed to wing assemblies for fixed-wing aircraft, but embodiments of the present technology can include aerodynamic lifting structures and/or airfoils for other types of aircraft and/or other systems in which improved structural, weight, and/or aerodynamic efficiency is desired, such as in wind turbine blades for generating power. Other embodiments can include marine implementations, such as in a hydrofoil boat or other watercraft (e.g., the present concepts can be applied to propulsion in water).

Specific details of several embodiments of the present technology are described herein with reference to FIGS. 1-11. The present technology, however, can be practiced without some of these specific details. In some instances, structures and processes that are well-known in aircraft (e.g., fixed-wing aircraft), such as airfoil shapes, control surfaces (e.g., ailerons, rudders, elevators, etc.), systems and mechanisms for controlling aerodynamic surfaces, fan rotors, electric motors, and other ancillary systems and/or components are not set forth in the following description to avoid obscuring aspects of the disclosure.

The terminology used in the description presented below is intended to be interpreted in its broadest reasonable manner, even though it is being used in conjunction with a detailed description of certain specific embodiments of the disclosure. Certain terms can even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements can be arbitrarily enlarged to improve legibility. Component details can be abstracted in the Figures to exclude details such as position of components and certain precise connections between such components when such details are unnecessary for a complete understanding of how to make and use the present technology. Many of the details, dimensions, angles, and other features shown in the Figures are merely illustrative of particular embodiments of the disclosure. Accordingly, other embodiments can have other details, dimensions, angles, and features without departing from the spirit or scope of the present technology.

Further, as used herein, the designations "forward," "rearward," "upward," "downward," "top," "bottom," etc., are not meant to limit the referenced component to use in a specific orientation. It will be appreciated that such designations refer to the orientation of the referenced component as illustrated in the Figures. However, the systems of the present technology can be used in any orientation suitable to the user.

FIG. 1 is a bottom perspective view of an aircraft 100 (also referred to as an aircraft system or a system) configured in accordance with embodiments of the present technology. The aircraft 100 can be a fixed-wing aircraft having a fuselage 105 (also referred to as the body of the aircraft), one or more wing assemblies 110 (also referred to as wings, wing systems, and the like) extending transversely from the fuselage 105, and a plurality of propulsion systems 115 integrated into the wing assemblies 110. In the embodiment illustrated in FIG. 1, the aircraft 100 includes two wing assemblies 110 (identified individually as a first wing assembly 110a and a second wing assembly 110b) extending from opposing sides of the fuselage 105 and mounted on a lower region of the fuselage 105. However, the wing assemblies 110 can be in any suitable position or arrangement relative to the fuselage 105, for example, high on the fuselage 105 or near the middle or shoulder of the fuselage 105, and/or the aircraft 100 can include a single wing assembly 110 or more than two wing assemblies 110). The aircraft 100 can have a wing-forward-tail-aft configuration (e.g., as generally shown in FIG. 1), a canard configuration, a tandem configuration, and/or another configuration suitable for fixed-wing flight. The aircraft 100 can be deployed in commercial, private, or other implementations for carrying passengers, cargo, and/or other materials or objects in the fuselage 105 and it can be capable of long-distance and/or high-speed flight, with speed, capacity, and/or other capabilities of aircraft. In some embodiments, the aircraft 100 can be piloted by a human in the aircraft 100, a human controlling the aircraft 100 remotely, and/or the aircraft 100 can be controlled autonomously, with or without human intervention.

Several propulsion systems 115 are indicated in FIG. 1, although some are unlabeled to avoid obscuring aspects of the drawing. For example, in some embodiments each wing assembly 110 can include sixteen individual propulsion systems 115. Other embodiments can include other quantities of individual propulsion systems 115 per wing assembly 110, such as one, two, three, four, five, six, seven, eight, more than eight, more than sixteen (e.g., twenty), or other suitable quantities, depending at least in part on aircraft size, thrust requirements, characteristics of the individual propulsion systems, and/or other factors associated with aircraft flight.

In various embodiments, the wing assembly 110 can define individual ducts 117 (e.g., channels) for each propulsion system 115 such that the components of the propulsion systems 115 are positioned entirely within the wing structure itself. For example, the ducts 117 can define a space that houses one or more fans (not shown) and one or more electric motors (not shown) connected to the fans to drive the fans to propel air or other fluid (e.g., water, in the case of a watercraft) through the ducts for thrust. As shown in FIG. 1, for example, the ducts 117 can have inlets 120 positioned toward leading portions 125 of the wing assemblies 110, with fans, motors, and/or other components of the propulsion systems 115 positioned within the duct 117 downstream from the inlet 120 such that the propulsion systems 115 are arranged to receive air flowing through the corresponding inlets 120. In some embodiments, electric motors of the propulsion systems 115 are operatively coupled to one or more electric power sources 130 (shown schematically) to supply power to the electric engines. Suitable electric power sources 130 can include one or more batteries, fuel cells, electric generators, or any other suitable source of electric power for the electric motors. As shown in FIG. 1, the fuselage 105 can carry the electric power sources 130, as well as suitable wiring, circuitry, and/or controllers connecting the electric power sources 130 to the propulsion systems 115 for powering and/or controlling the propulsion systems 115. In some embodiments, the wing assembly 110 and/or other parts of the aircraft 100 can carry the electric power sources 130, related circuitry, controllers, and/or other associated components.

Advantageously, electric motors can be small, mechanically simple, quiet, and/or efficient compared to conventional combustion engines. For example, maintenance intervals, costs, and installation difficulty can be less for electric motors relative to combustion engines. Accordingly, many embodiments described below include wing assemblies with several electric propulsion systems using electric motors driving fans, although other embodiments of wing assemblies described herein can implement combustion-powered fans (e.g., turbofans) and/or other types of powered-fans instead of, or in addition to, electrically-driven fans. Details regarding the fan and engine structures of the propulsion system 115 are described in further detail below with respect to FIGS. 3A-4 and thereafter.

In some embodiments, only a portion of the wing assembly 110 includes the propulsion systems 115. For example, as shown in the embodiment illustrated in FIG. 1, the wing assembly 110 can include a first portion 135 (e.g., an inboard region) with several propulsion systems 115, while a second portion 140 (e.g., a region outboard of the first portion) does not have any propulsion systems 115 integrated therein. In some embodiments, the propulsion systems 115 are distributed along a full length or span of each wing assembly 110. In some embodiments, the first portion 135 having the propulsion systems 115 can originate at a side of the fuselage 105 or it can originate further outboard to accommodate a wing fairing and/or to create a volume for stowing landing gear, and/or for other uses. In some embodiments, the first portion 135 can span a distance of 25%, 50%, 67%, or 100% of a total length of the wing assembly 110, although other embodiments can include the propulsion systems 115 spanning other suitable lengths of the wing assembly 110.

Some embodiments of the wing assemblies 110 can include a compact and linear arrangement of propulsion systems 115 and supporting structure that facilitates weight savings. For example, the distribution of propulsion system weight along the wingspan (or along part of the wingspan) can provide for structural designs that reduce, minimize, and/or distribute wing bending moments, thereby reducing a need for bulky structural components.

Figure 2:
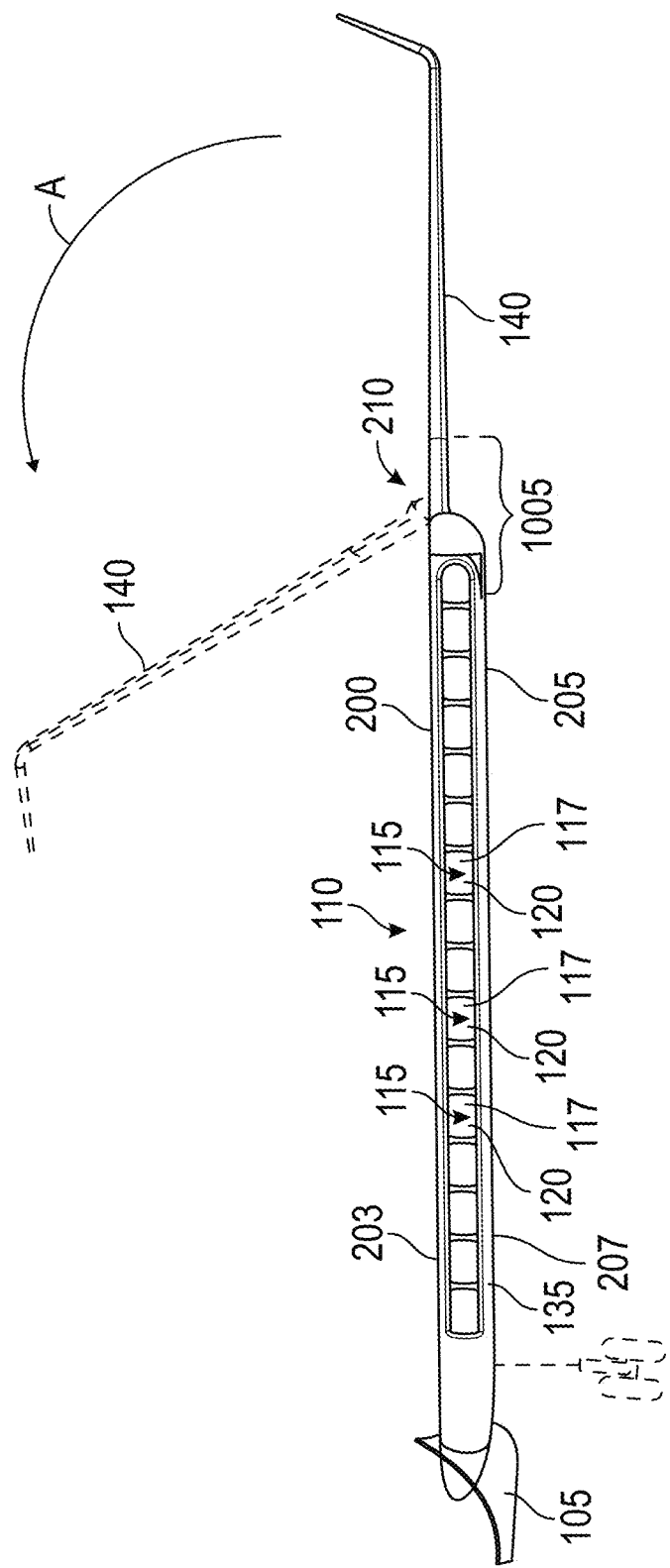
FIG. 2 is a front perspective view of one of the wing assemblies of the aircraft of FIG. 1.

FIG. 2 is a front perspective view of one of the wing assemblies 110 of the aircraft 100 of FIG. 1. The wing assembly 110 includes an upper wing portion 200 having an upper exterior surface 203 positioned to face exterior airflow above the wing assembly 110 and a lower wing portion 205 having a lower exterior surface 207 positioned to face exterior airflow below the wing assembly 110. As shown in FIG. 2, the plurality of individual propulsion systems 115 are positioned between the upper wing portion 200 and the lower wing portion 205. Embodiments of the present technology implement the individually embedded propulsion systems 115 in the wing assemblies 110 while maintaining uniform or nearly uniform upper and lower surfaces of the wing assemblies 110 along at least part of the spans of the wing assemblies 110. For example, as generally shown in FIG. 2, the first portion 135 (containing the individual propulsion systems 115) has smooth exterior surfaces 203, 207, instead of undulating surfaces or bulges above and below the propulsion systems 115 that can undesirably cause aerodynamic and/or structural inefficiencies.

In some embodiments, one or more of the wing assemblies 110 can include features that allow one or more portions of the wing assembly 110 to pivot or otherwise move with respect to another portion. As shown in FIG. 2, for example, the wing assembly 110 can include a wing folding mechanism 210, such as a hinge structure, that allows the outboard, second portion 140 of the wing assembly 110 to fold (e.g., pivot, hinge) or otherwise move relative to the first portion 135 of the wing assembly 110. For example, the outboard, second portion 140 can be hinged or otherwise pivoted to move upwardly (e.g., toward 90 degrees relative to the upper exterior surface 203) and then inwardly toward the first portion 135 or fuselage 105 along pathway A (e.g., up to 180 degrees) such that the second wing portion 140 can be positioned against, near, or flush with the upper exterior surface 203 of the wing assembly 110. In some embodiments, the wing folding mechanism 210 can move the second portion 140 in a downward direction such that it pivots in a manner that allows it to move toward the lower exterior surface 207 of the first portion 135. In some embodiments, the wing folding mechanism 210 allows for bidirectional movement.

Folding the wing assembly 110 in this manner reduces the overall aircraft wingspan of the wing assembly 110. For example, depending on the location of the wing folding mechanism 210 and the dimensions of wing portions connected thereto, the wingspan can be reduced up to 50%, or more than 50% relative to the unfolded configuration. In the folded configuration, the aircraft 100 has a smaller operating envelope for ground operations, such as taxiing, accessing airport gates, and storage. In some embodiments, each wing assembly 110 can include more than one wing folding mechanism 210 positioned along its length such that the wing can pivot to a variety of different lengths and/or in multiple directions. In some embodiments, each of one or more of the wing assemblies 110 can omit the wing folding mechanism 210 such that the wing assemblies 110 rigidly extend along their entire length.

Although FIGS. 1 and 2 are not necessarily to scale, a benefit to incorporating the propulsion systems 115 into the wing assembly 110 is greater overall thickness of the wing assembly 110 relative to wings without embedded propulsion systems (e.g., as can be seen by comparing a thickness of the first portion 135 between the top exterior surface 203 and the bottom exterior surface 207 with the thickness of the adjacent outboard, second portion 140). The greater thickness facilitates more overall structural strength in the wing 110, which can reduce stresses in components of the wing 110 such as spar caps or skins, such that thinner spar caps or skins may be implemented relative to conventional aircraft designs.

Figure 3A:
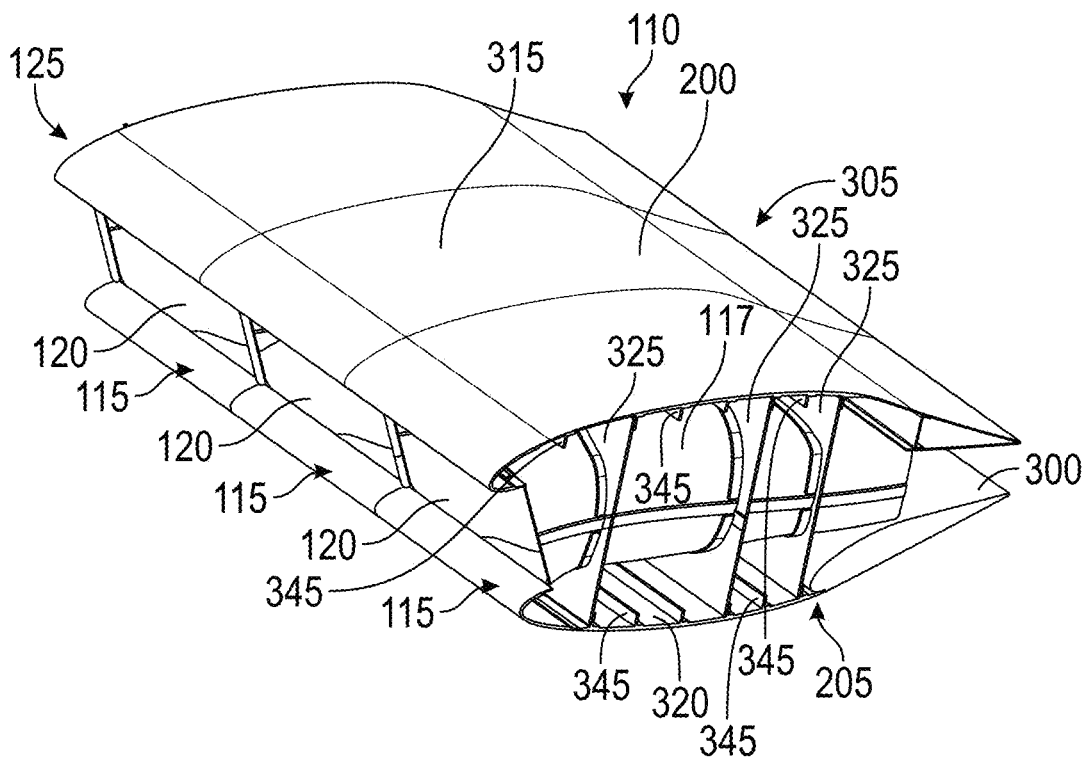
FIG. 3A is an enlarged, top perspective view of a section of the wing assembly shown in FIG. 2 configured in accordance with embodiments of the present technology.
Figure 3B:
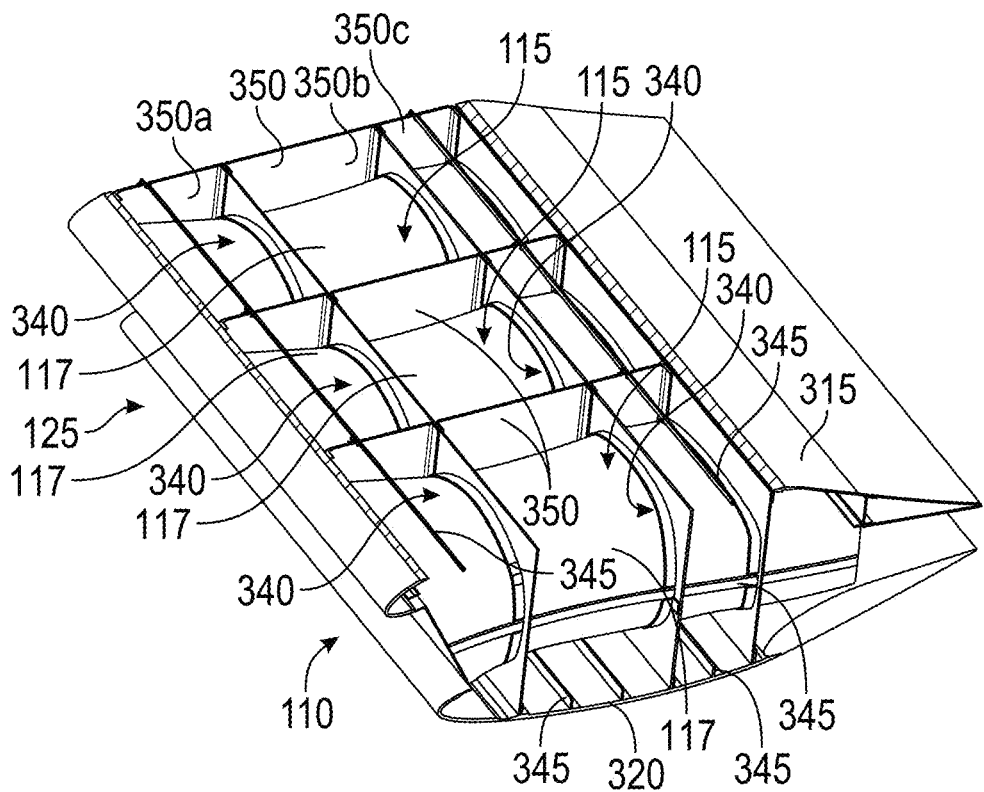
FIG. 3B is a top perspective view of the portion of the wing assembly shown in FIG. 3A, in which part of the upper wing portion has been removed to provide visibility of interior components of the wing assembly.

FIG. 3A is an enlarged, top perspective view of a section of the wing assembly 110 shown in FIG. 2 configured in accordance with embodiments of the present technology. To illustrate details of the wing assembly 110 and integrated propulsion systems 115, the section shown in FIG. 3A includes components surrounding three propulsion systems 115. The portion shown in FIG. 3A can generally be repeated in whole or in part along a span of the wing assembly 110 depending on factors such as the total quantity of propulsion systems 115 carried by the aircraft 100. The upper wing portion 200 can include an upper skin 315. The lower wing portion 205 can include a lower skin 320. FIG. 3B is top perspective view of the portion of the wing assembly 110 shown in FIG. 3A, in which part of the upper wing portion 200 (i.e., a portion of the upper skin 315) has been removed to provide visibility of interior components of the wing assembly 110. In some embodiments, portions of the skins 315, 320 can be removable and/or replaceable to facilitate installing, removing, and/or maintaining the propulsion systems 115.

With reference to FIG. 3A and/or FIG. 3B, each propulsion system 115 has its own airflow inlet 120 at the leading portion 125 of the wing assembly 110 and its own airflow outlet 300 at a trailing portion 305 of the wing assembly 110, the trailing portion 305 being located opposite the leading portion 125 along a chord of the wing assembly 110. Each propulsion system 115 can include its own individual duct 310 positioned between the inlet 120 and the outlet 300 to form an airflow path between the inlet 120 and the outlet 300. The ducts 117 can be positioned between the skins 315, 320.

In some embodiments, the wing assembly 110 can include one or more spars 325 extending along a spanwise direction of the wing assembly 110 (i.e., transversely, for example laterally, from the fuselage 105). Each of the spars 325 can extend some or all of a length of the wing assembly 110 (e.g., at least a length of the inboard portion 135). Each spar 325 can include openings 340 for receiving the ducts 117, such that the ducts 117 pass through the spars 325. Accordingly, the spars 325 can provide structural support for the overall wing assembly 110 and they can support the ducts 117 (e.g., by framing the ducts 117) within the wing assembly 110. Each opening 340 can have a size and/or shape that corresponds to an external perimeter size and/or shape of the portion of the duct 117 passing through the opening 340, as described in additional detail below with regard to various shear web configurations of the spars 325. In some embodiments, and as shown in FIGS. 3A and 3B, the upper and lower skins 315, 320 function as spar caps for the spars 325. In other embodiments, other spar caps may be implemented at the top and/or bottom of the spars 325. In some embodiments, the wing assembly 110 can include one or more stringers 345 attached to the skins 315, 320 for further supporting the skins 315, 320.

The wing assembly 110 can include one or more ribs 350 positioned between adjacent propulsion systems 115 (i.e., between adjacent ducts 117) and extending between the skins 315, 320 transversely relative to the spars 325 and/or stringers 345. The ribs 350 can provide additional structural support for the wing assembly 110. In some embodiments, one or more ribs can be discontinuous along the chord length of the wing assembly 110, for example, one or more ribs may be formed with separate rib portions 350a, 350b, 350c that are affixed to adjacent spars 325, such that rib portions extend between adjacent spars 325.

Figure 3C:
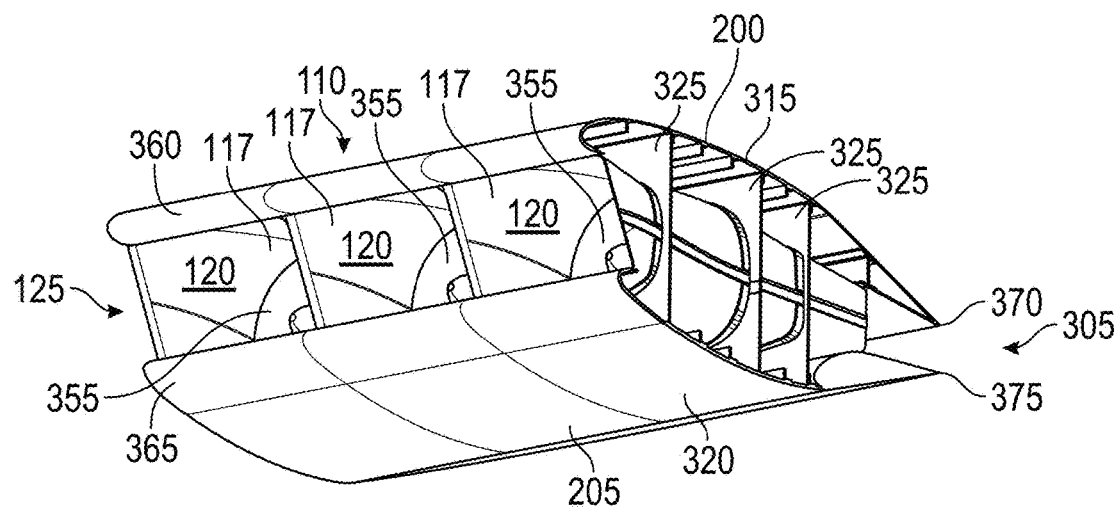
FIG. 3C is a lower front perspective view of the portion of the wing assembly shown in FIG. 3A.
Figure 3D:
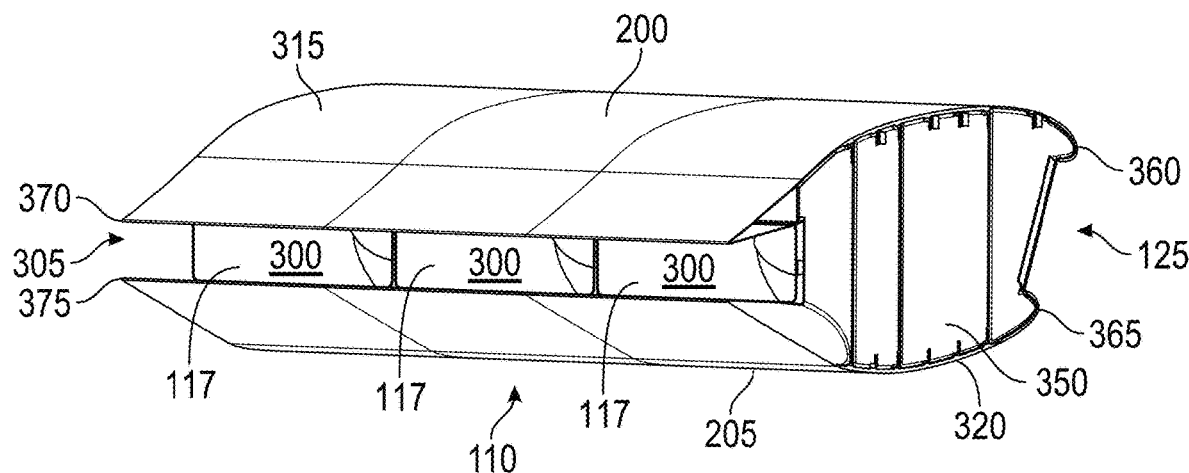
FIG. 3D is a rear perspective view of the portion of the wing assembly shown in FIG. 3A.

FIG. 3C is a lower front perspective view of the portion of the wing assembly 110 shown in FIG. 3A. The perspective in FIG. 3C shows representative fans 355 (idealized in the drawing as a simple disk) of the propulsion systems 115, which direct air through the ducts 117 via power from suitable motors and/or engines. FIG. 3D is a rear perspective view of the portion of the wing assembly 110 shown in FIG. 3A. With reference to FIGS. 3C and 3D, in some embodiments, the leading portion 125 of the wing assembly 110 can include an upper leading edge 360 of the upper wing portion 200 above the inlets 120, and a lower leading edge 365 of the lower wing portion 205 below the inlets 120. The trailing portion 305 of the wing assembly 110 can include an upper trailing edge 370 of the upper wing portion 200 above the outlets 300, and a lower trailing edge 375 of the lower wing portion 205 below the outlets 300. In some embodiments, one or more of the leading edges 360, 365 or the trailing edges 370, 375 can be movable to change characteristics of the wing assembly 110 and/or the propulsion systems 115, for example, to control lift, drag, and/or other aerodynamic characteristics of the wing assembly 110, and/or to control performance of the propulsion systems 115, as described in additional detail below.

Figure 4:
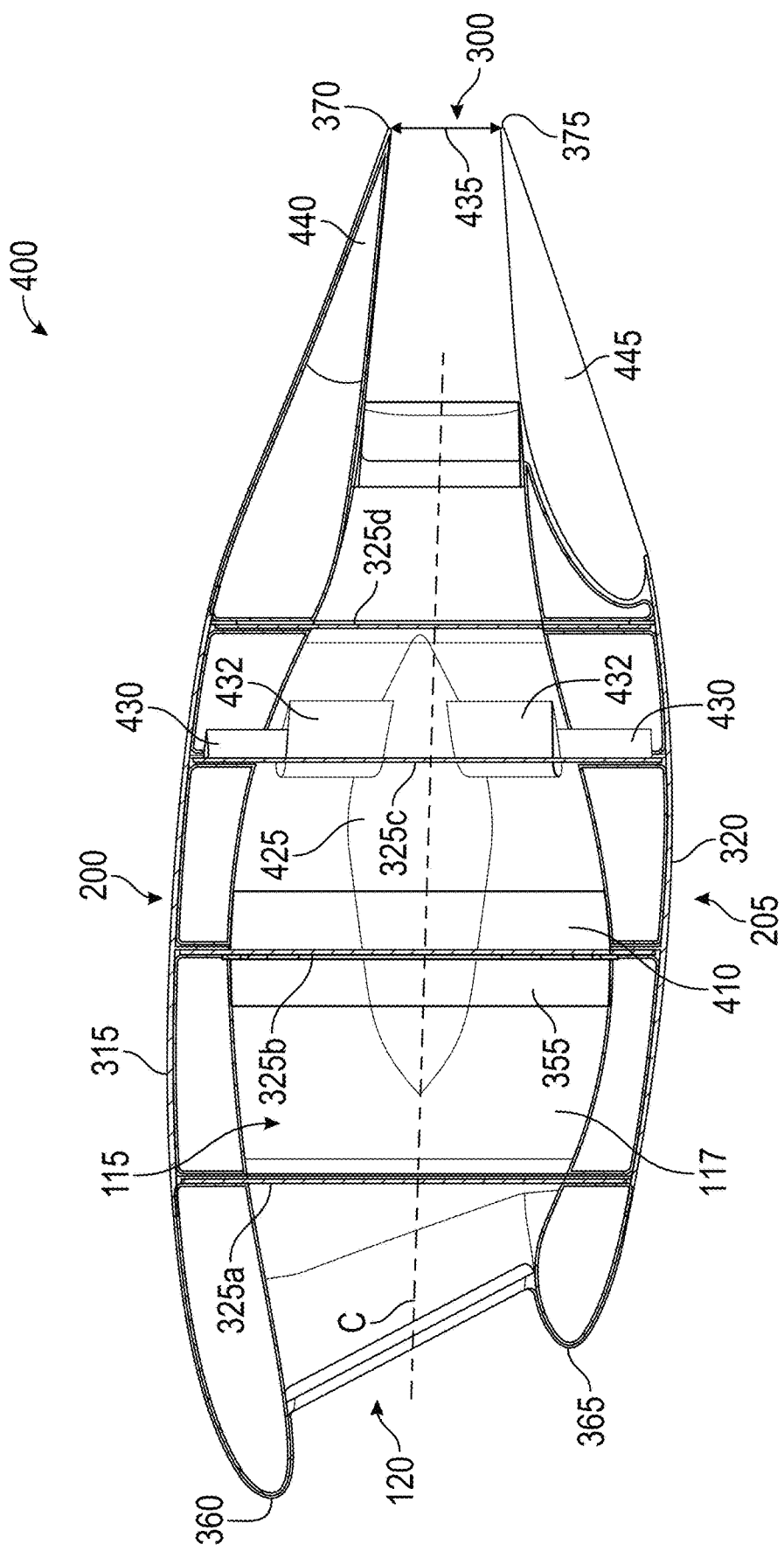
FIG. 4 is a side cross-sectional side view of a portion of a wing assembly configured in accordance with embodiments of the present technology.

FIG. 4 is a partially schematic, cross-sectional side view of a portion of a wing assembly 400 configured in accordance with embodiments of the present technology. The wing assembly 400 can be generally similar to the wing assembly 110 described above with regard to FIGS. 1-3D. FIG. 4 shows one representative propulsion system 115 in cross section.

In some embodiments, the duct 117 includes a converging and/or diverging shape suitable for producing thrust at the outlet 300. For example, beginning toward the inlet 120, the duct 117 can diverge to a larger interior opening where a fan 355 and an optional stator 410 are located and closely toleranced within the duct 117. From the larger opening at the fan 355, the duct 117 can converge toward the outlet 300 to increase airflow velocity (for subsonic flow). In some embodiments, an electric motor 425 or other suitable power device is also positioned in the duct 117, supported by one or more supports 430 or other suitable motor mounting elements. In some embodiments, the supports 430 can include aerodynamic fairings 432 to minimize disruption of the airflow past the supports 430. One or more passageways within the supports 430 can carry plumbing or cables for power, cooling fluids, fuel, etc. The duct 117 accordingly has an interior aerodynamic contour suitable for providing thrust via the fan 355 and the electric motor 425 (or another suitable power source, such as a combustion engine system). Although subsonic flow is described herein, in some embodiments, the duct 117, the motor 425, the fan 355, and/or other components can be suitably configured for high subsonic, transonic, and/or supersonic flight conditions (e.g., by varying the converging and diverging shape of the duct 117 according to well-known principles).

The spars 325 are positioned at suitable locations along the chord of the wing assembly 110 to provide suitable strength for the wing assembly 400, and/or for supporting the duct 117 and/or the motor 425. For example, the wing assembly 400 can include a forward spar 325a supporting a forward portion of the duct 117 and other forward portions of the wing assembly 400, a forward-mid spar 325b supporting a corresponding portion of the duct 117 and/or other components of the propulsion system 115 such as the stator 410, an aft-mid spar 325c supporting a corresponding portion of the duct 117 and/or other components of the propulsion system 115 such as the motor 425 (e.g., via one the supports 430), and/or an aft spar 325d for supporting a trailing portion of the duct 117.

In some embodiments, the structure of the wing assembly 400 forms a nozzle for each propulsion system 115. For example, the duct 117, along with structure of the wing assembly 400 between the duct 117 and the upper trailing edge 370, and between the duct 117 and the lower trailing edge 375, form a nozzle for the propulsion system 115. In the configuration shown in FIG. 4, a nozzle throat 435 (i.e., the most restrictive cross-sectional area of the engine airflow path downstream of the fan 355) can be defined at least in part as the space between the upper trailing edge 370 and the lower trailing edge 375.

In some embodiments, some or all of the leading edge 360 of the upper wing portion 200 can be positioned ahead of some or all of a leading edge 365 of the lower wing portion 205. In other embodiments, some or all of the leading edge 360 of the upper wing portion 200 can be longitudinally aligned with some or all of the leading edge 365 of the lower wing portion 205. In other embodiments, some or all of the leading edge 360 of the upper wing portion 200 can be behind some or all of the leading edge 365 of the lower wing portion 205. In yet further embodiments, some or all of the trailing edge 370 of the upper wing portion 200 can be positioned ahead of, longitudinally aligned with, or behind some or all of the trailing edge 375 of the lower wing portion 205.

In some embodiments, one or more movable structures at the leading and/or trailing edges of the wing assembly 400 can vary the shape and/or size of the inlet 120, and/or vary the shape, size, and/or position of the nozzle throat 435, to change characteristics of the propulsion system 115 during operation. For example, varying the shape, size, and/or position of the nozzle throat 435 can control propulsive efficiency of the engine by adjusting backpressure, and/or adjusting parameters of the inlet 120 and/or the nozzle throat 435 can control fan stall or surge margin. Moving the leading and/or trailing edges can also control lift, drag, and/or other parameters of wing performance.

In some embodiments, the upper trailing edge 370 and/or the lower trailing edge 375 can be movable to change the size of the nozzle throat 435. For example, one or both of the trailing edges 370, 375 can be positioned on actuatable and movable structures, such as flaps or other control surfaces, that can adjust the size, shape, and/or area of the nozzle exit and/or control aerodynamic forces on the overall wing assembly 400. Controlling the movable structures allows thrust, lift, and/or drag to be optimized for various speed and altitude conditions. Accordingly, in some embodiments, the wing assembly 400 includes an upper control surface 440 that is controllably movable relative to the remainder of the wing assembly 400, and/or a lower control surface 445 that is controllably movable relative to the remainder of the wing assembly 400. In some embodiments, the control surfaces 440, 445 can be high-lift control surfaces suitable for take-off and landing. They can have the additional function of changing performance of the propulsion system 115 by changing the size of the nozzle throat 435. Accordingly, embodiments of the present technology facilitate adjustment of the performance of the propulsion system 115 and directional and/or lift control of an overall aircraft 100.

Figure 5A:
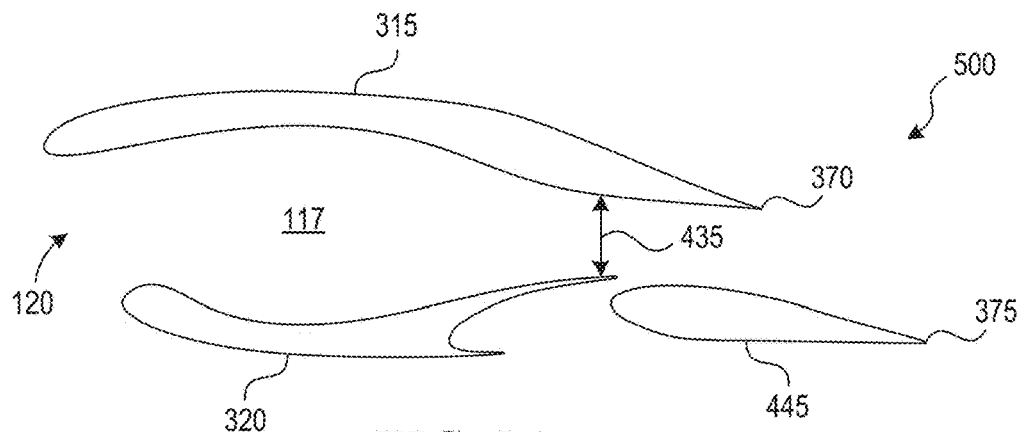
FIGS. 5A, 5B, and 5C are schematic cross-sectional views of a wing assembly in various stages of flight, according to embodiments of the present technology.
Figure 5B:
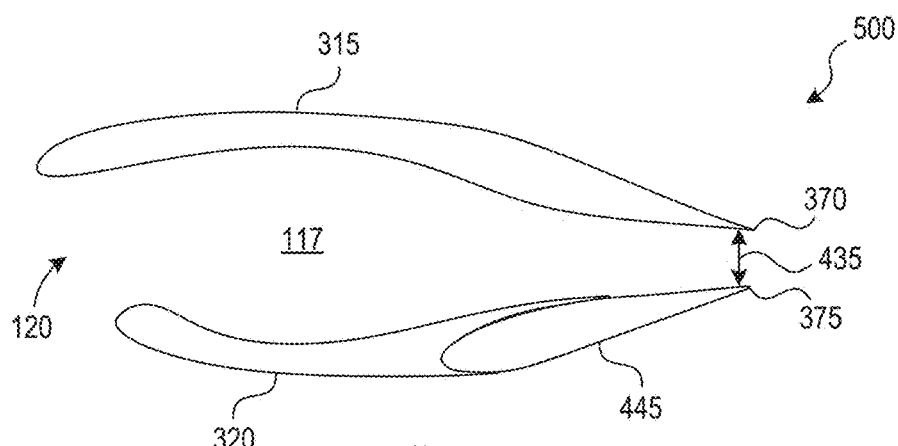
Figure 5C:
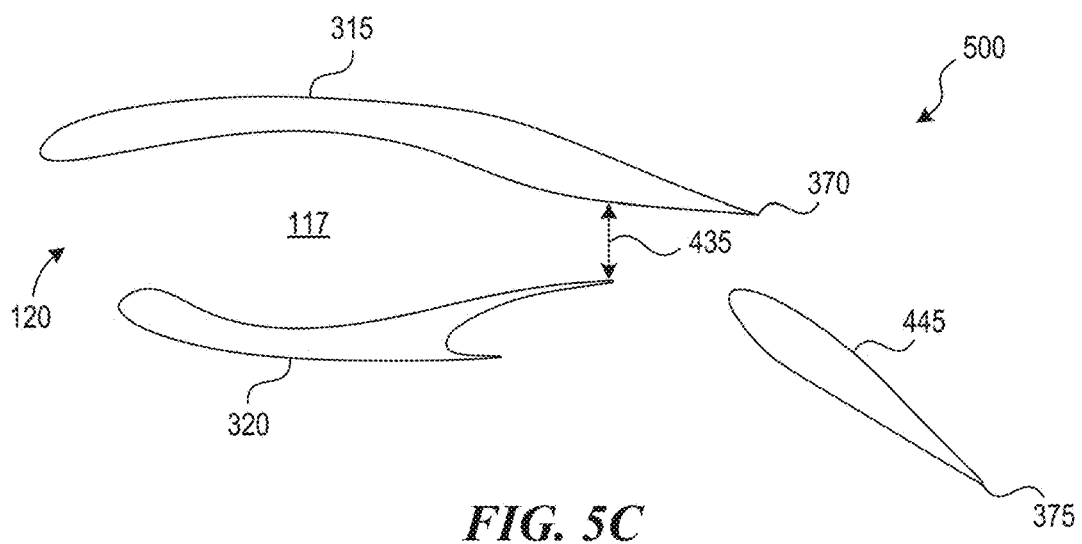

FIGS. 5A, 5B, and 5C are schematic cross-sectional views of a wing assembly 500 in various stages of flight, according to embodiments of the present technology. The wing assembly 500 can be generally similar to the wings 110, 400 described above with regard to FIGS. 1-4. In some embodiments, only the lower trailing edge 375 may be movable, such that the wing assembly 500 can only include a lower control surface 445 (e.g., a flap), although in further embodiments, the wing assembly 500 can further include an upper control surface (e.g., the upper control surface 440 described above with regard to FIG. 4). With reference to FIGS. 5A, 5B, and 5C, the location of the nozzle throat 435 can shift fore and/or aft depending at least in part on the position and/or orientation of the lower control surface 445. The size of the nozzle throat 435 can also change during flight, which can change backpressure and flow rate in the propulsion system 115.

FIG. 5A shows the wing assembly 500 in a takeoff configuration, in which the lower control surface 445 is partially extended for increased lift from the wing assembly 500 at takeoff speeds (e.g., takeoff speeds associated with a passenger or cargo aircraft). With the lower control surface 445 partially extended, the nozzle throat 435 is located upstream of the trailing edges 370, 375. Such a configuration reduces backpressure in the duct 117 and allows a relatively higher flow rate through the propulsion system 115, with a lower exit velocity, relative to other configurations. The reduced backpressure and other aspects of this configuration can also increase a stall margin of the fan (e.g., the fan 355), making the overall propulsion system 115 more resistant to disturbances such as a wind gust or other distortion at the inlet 120, which may otherwise have caused a loss or reduction in thrust.

FIG. 5B shows the wing assembly 500 in a cruise configuration, in which the lower control surface 445 is retracted and the overall airfoil shape (e.g., camber) and nozzle exit are suitable for high-speed flight (e.g., subsonic, transonic, or even supersonic flight). The nozzle throat 435 is positioned between the trailing edges 370, 375. In some embodiments, the nozzle throat 435 can have an area that is between 50% and 80% of the nozzle throat area in the takeoff configuration (depending on overall design, for example), which can increase backpressure in the duct 117 and increase exit velocity from the propulsion system 115 relative to the takeoff configuration. In cruise, the propulsion system 115 can operate with stability and efficiency at high speeds.

FIG. 5C shows the wing assembly 500 in a landing configuration, in which the lower control surface 445 is partially extended for increased lift from the wing assembly 500 at landing speeds. The landing configuration can be generally similar to the takeoff configuration, except that a landing configuration can call for higher lift at the expense of drag (because the goal is to slow down and stop), so the lower control surface 445 may be extended farther than its position in the takeoff configuration shown in FIG. 5A. When the lower control surface 445 is extended, the nozzle throat 435 is again upstream of the trailing edges like in the takeoff configuration shown in FIG. 5C, resulting in increased low-speed propulsion performance.

In general, the lower control surface 445 can provide conventional effects of a flap in an aircraft (e.g., longer chord length for more lift, more camber, etc.), while further facilitating movement of the nozzle throat 435 to change engine performance by adjusting backpressure, airflow rate, and exit velocity to tailor engine performance (e.g., efficiency of the rotor 405) to the specific flight regime. Although FIGS. 5A, 5B, and 5C show a single-slotted flap (i.e., a single gap between the lower control surface 445 and the lower wing portion 205), the lower control surfaces 445 can be implemented as hinged plain flaps, multiple-slotted flaps, or other suitable configurations.

Figure 6:
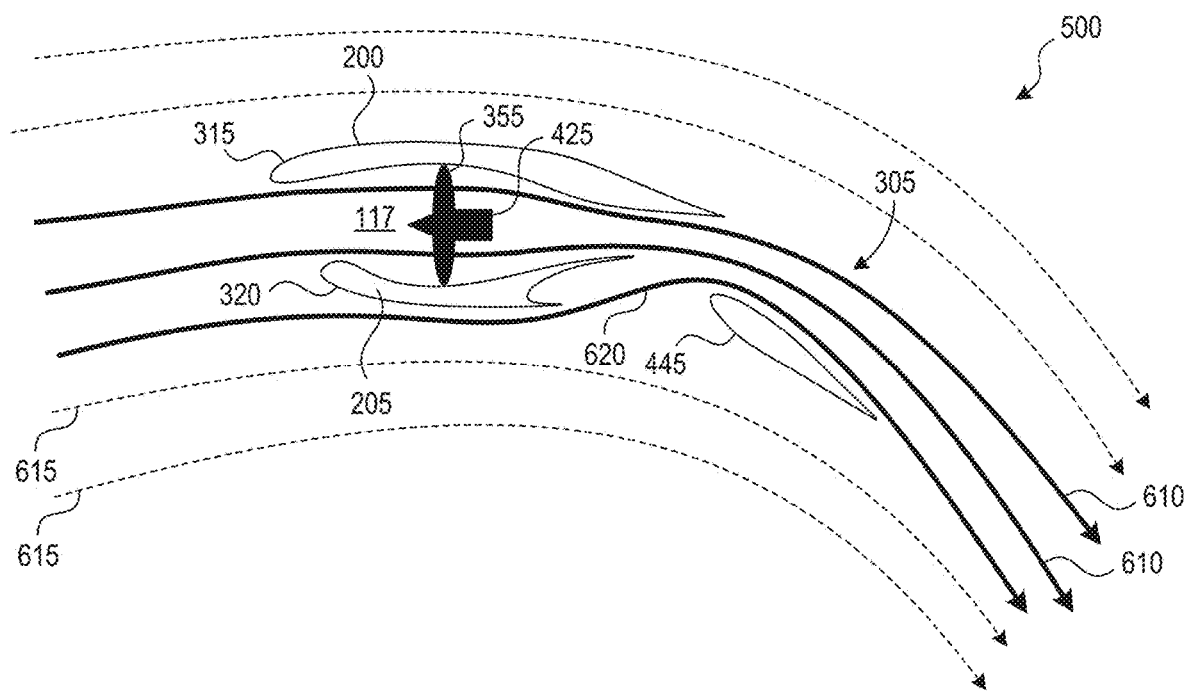
FIG. 6 is a schematic cross-sectional view of the wing assembly shown in FIG. 5A or FIG. 5C.

FIG. 6 is a schematic cross-sectional view of the wing assembly 500 shown in FIG. 5A or FIG. 5C (i.e., in a stage of flight generally corresponding to a high-lift situation such as takeoff or landing). FIG. 6 includes several dashed and solid lines for schematically illustrating representative airflow pathways, and to demonstrate a blown flap effect of the present technology. A schematic representation of an electric motor 425 and its corresponding fan 355 are also shown in FIG. 6. The electric motor 425 and the fan 355 generate airflow (thrust) that exits from the trailing portion 305 of the wing assembly 500 (i.e., from between the upper wing portion 200 and the lower wing portion 205, including any movable structures attached thereto, such as the lower control surface 445). Exit flow 610 from the wing assembly 500 and external airflow 615 can influence each other. For example, the exit flow 610 entrains additional flow 620 that can encourage attached flow over the external wing surfaces (e.g., over the lower control surface 445) at conditions that would otherwise tend to separate and create increased drag. When directed over a flap surface, the high-velocity exit flow will increase circulation and lift due to the Coanda effect and a change in vertical momentum. This deflected flow 620 also creates a change in overall circulation around the wing section, amplifying the lifting effect.

Figure 7:
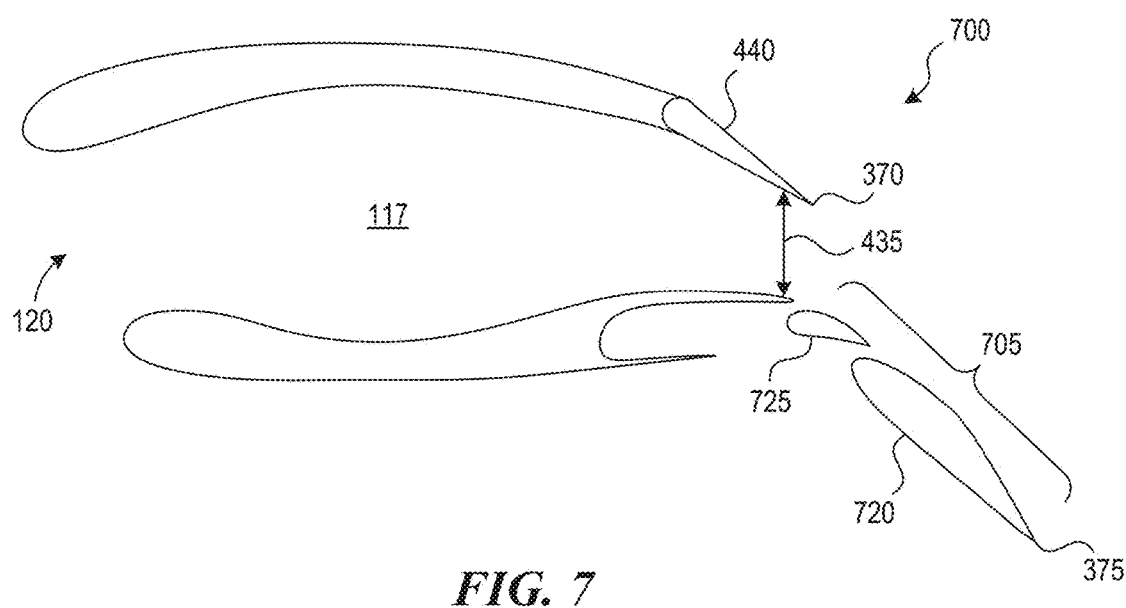
FIG. 7 is a schematic cross-sectional view of a wing assembly configured in accordance with embodiments of the present technology.

FIG. 7 is a schematic cross-sectional view of another wing assembly 700 configured in accordance with embodiments of the present technology. The wing assembly 700 can be generally similar to the wing assemblies 110, 400, 500 described above, and it can be implemented in the aircraft 100. For example, it can include a duct 117 containing an electric motor 425 (not shown in FIG. 7) and corresponding components such as rotors and stators (see, e.g., FIGS. 4 and 6). The upper trailing edge 370 and the lower trailing edge 375 can be positioned on actuatable and movable structures, such as flaps or other control surfaces, that can adjust the size of the nozzle exit and/or control aerodynamic forces on the overall wing assembly 700. For example, in some embodiments, the upper control surface 440 can include the upper trailing edge 370, and a lower control surface 705 can include the lower trailing edge 375. The upper control surface 440 (e.g., a plain flap) can be pivotably attached to wing assembly 700 above the duct 117. The lower control surface 705 can be movably attached to the wing assembly 700 below the duct 117. The lower control surface 705 can be a double-slotted flap having a primary flap portion 720 extendable rearwardly and downwardly from the lower wing portion 715, and an intermediate flap portion 725 between the primary flap portion 720 and the lower wing portion 715. The upper control surface 440 can control the size and/or position of the nozzle throat 435, thereby controlling backpressure, flow velocity, etc. The lower control surface 705 can generate high lift for takeoff and/or landing. Moving one or more (such as all) of the movable structures carrying the trailing edges 370, 375 into various configurations provides multiple selectable settings of nozzle throat area, lift, and/or drag.

FIG. 8A is a schematic cross-sectional view of another wing assembly 800 configured in accordance with embodiments of the present technology. The wing assembly 800 can be generally similar to the wing assemblies described above with regard to FIGS. 1-7, and it can be implemented in the aircraft 100. The wing assembly 800 can include the duct 117 and/or one or more movable structures 805 (e.g., flaps or control surfaces) for moving the trailing edges 370, 375, for adjusting the size and/or position of the nozzle throat, and/or for controlling aerodynamic parameters such as lift and/or drag. In some embodiments, the wing assembly 800 can further include one or more additional movable structures 810 on or at one or more of the leading edges 360, 365 for further controlling performance of the propulsion system 115 (e.g., by adjusting the shape and/or size of the inlet 120) and/or aerodynamics of the wing assembly 800.

For example, the wing assembly 800 can include a deployable hinged surface 815 to form a drooped leading edge. The hinged surface 815 can be deployed to rotate from a stowed position generally inside the duct 117 or otherwise below an upper wing portion 820, to a position forward of the upper wing portion 820, which moves the upper leading edge 360 from a first position to a second position 360*a* forward of, and below, its original position on the upper wing portion 820. The hinged surface 815 can function as a slat (e.g., assist with high lift in low speed operations such as takeoff and/or landing), increase the stall angle of attack of the wing assembly 800, protect the upper wing portion 820 from leading edge contamination (e.g., at the first position of the upper leading edge 360), and/or change characteristics of the inlet 120 for customizing operation of the propulsion system 115 in various stages of flight.

FIG. 8B is a schematic cross-sectional view of another wing assembly 825 configured in accordance with embodiments of the present technology. The wing assembly 825 can be generally similar to the wing assemblies described above with regard to FIGS. 1-7, such that the wing assembly 825 can include a duct 117 and/or one or more movable structures 805 (e.g., flaps or control surfaces) for moving the trailing edges 370, 375, for adjusting the size and/or position of the nozzle throat, and/or for controlling aerodynamic parameters such as lift and/or drag. In some embodiments, the wing assembly 825 can further include additional movable structures 830*a*, 830*b* for moving the upper leading edge 360 and/or the lower leading edge 365. For example, the additional moveable structures 830*a*, 830*b* can include an upper movable structure 830*a* that is extendable from an upper wing portion 835, for example, by translating the upper movable structure 830*a* forward to translate the upper leading edge 360 forward. The additional movable structures 830*a*, 830*b* can include a lower movable structure 830*b* that is pivotable relative to a lower wing portion 835 to move the lower leading edge 365. In some embodiments, the lower movable structure 830*b* can translate and the upper movable structure 830*a* can pivot. In further embodiments, each movable structure 830*a*, 830*b* can both pivot and translate. Deflecting and/or extending the lower movable structure 830*b* can facilitate guiding flow into the inlet 120, which can reduce flow distortion and improve efficiency of the rotor 405, which can further facilitate higher thrust at takeoff and landing conditions.

In general, moving the leading edges 360, 365 forward can reduced distortion of the rotor 405 at low-speed and high-power settings, which can increase achievable lift by reducing the severity of pressure at the rotor 405. Extending the upper leading edge can encourage attached flow on the upper surface of the wing even for high incidence angles. In some embodiments, moving the leading edges 360, 365 can form a slot or gap between the movable structures (e.g., 830*a*, 830*b*) and the adjacent wing structure (e.g., the corresponding adjacent upper or lower wing portions). In other embodiments, the movable structures 830*a*, 830*b* can be extended or deployed without forming a gap.

In general, varying the positions and/or angles of each movable structure in the various embodiments disclosed herein via hinges, linkage mechanisms, and/or guide tracks (and/or other suitable movement mechanisms known in the art for operating aerodynamic control surfaces) controls the magnitudes of the thrust and lift benefits of the movable structures.

Figure 9A:
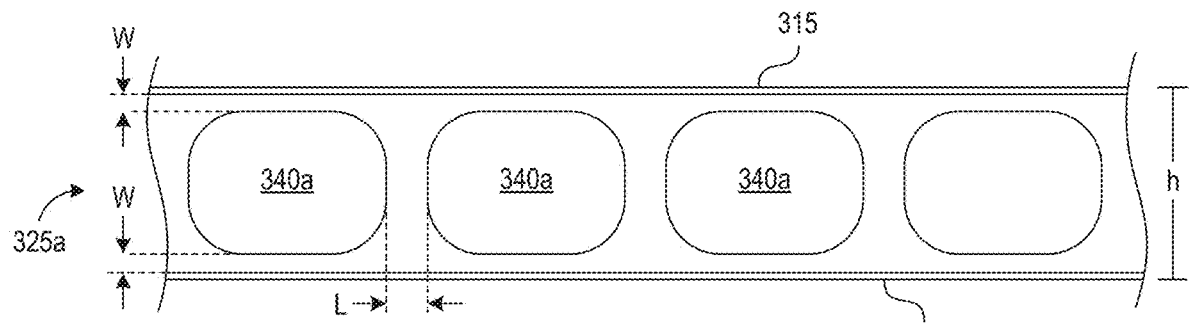
FIGS. 9A, 9B, 9C, and 9D illustrate schematic front views of portions of wing spars suitable for implementation in wing assemblies described herein, according to embodiments of the present technology.
Figure 9B:
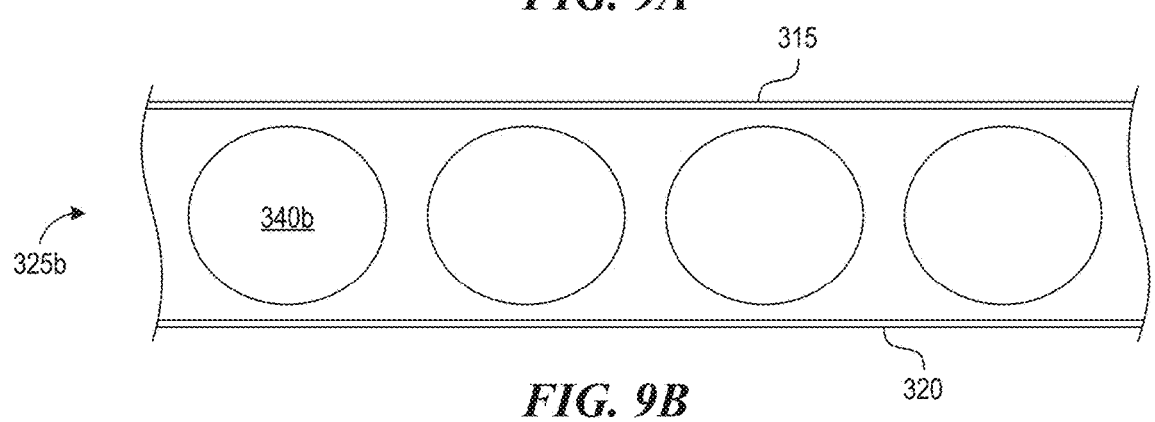
Figure 9C:
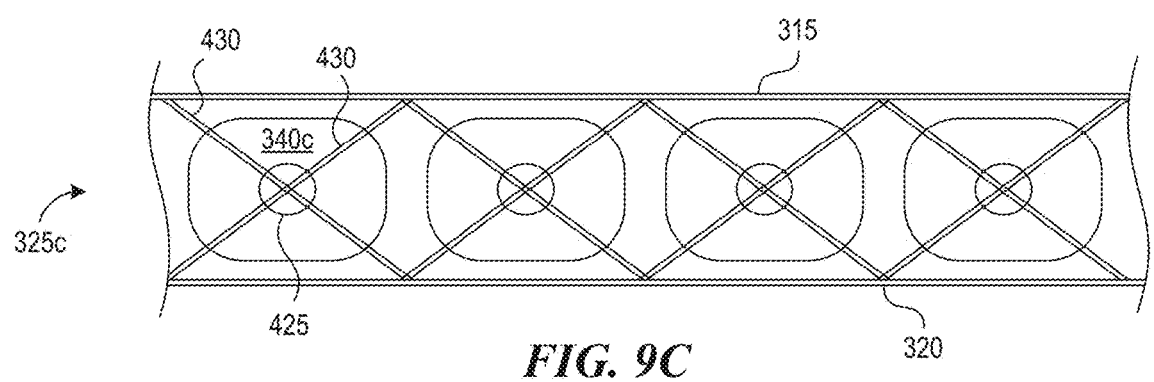
Figure 9D:
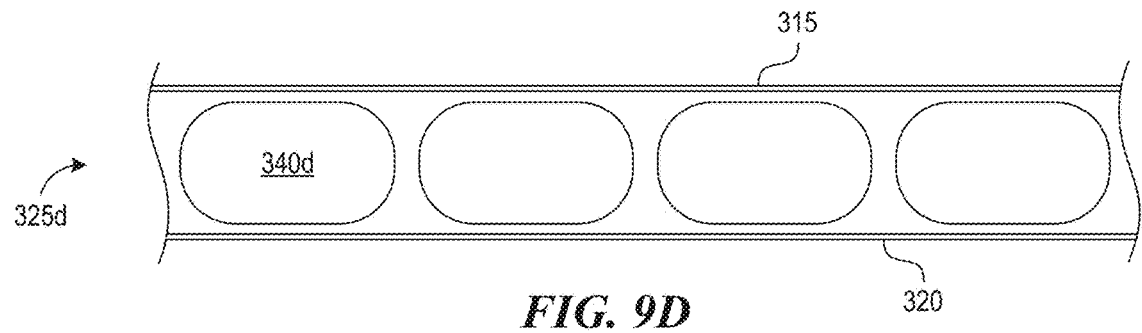

FIGS. 9A, 9B, 9C, and 9D illustrate schematic front perspective views of portions of wing spars suitable for implementation in wing assemblies described herein, according to embodiments of the present technology. More specifically, each of FIGS. 9A, 9B, 9C, and 9D illustrates a representative shear web suitable for implementation at a corresponding position along the length of the chord, for supporting the ducts 117. For example, with additional reference to FIG. 4, FIG. 9A illustrates the forward spar 325*a*, FIG. 9B illustrates the forward-mid spar 325*b*, FIG. 9C illustrates the aft-mid spar 325*c*, and FIG. 9D illustrates the aft spar 325*d*. In some embodiments, each spar 325*a-d* can be connected to the upper and lower skins 315, 320, which can function as spar caps, or on other embodiments, each spar 325*a-d* can be connected to the upper and lower skins 315, 320 via intermediate elements functioning as spar caps. The spars 325 transfer some of the vertical load along the wing assemblies. In some embodiments, stresses in the upper and lower spar cap material (e.g., the upper and lower skins or intermediate spar caps) are reduced by a factor of approximately $1/h^2$, where h is a height or thickness of the spar 325. The reduced stresses facilitate building the wing assemblies with less material, thereby resulting in a reduction in weight.

With reference to FIG. 9A, the forward spar 325*a* can include rounded rectangular, oblong, or otherwise suitably shaped openings 340*a*, through which a correspondingly shaped portion of the duct 117 can pass (see, e.g., FIGS. 3B and 4). In some embodiments, a distance W between the openings 340*a* and top and bottom ends of the forward spar 325*a* (e.g., at the upper and lower skins 315, 320) can be between zero and thirty percent of a total wing thickness at the location of the forward spar 325*a* along the chord (e.g., in a particular example, twenty percent of the total wing thickness). In some embodiments, a distance L between adjacent openings 340*a* can be between zero and thirty percent of the total wing thickness at the location of the forward spar 325*a* along the chord (e.g., in a particular example, twenty percent of the total wing thickness).

With reference to FIG. 9B, the forward-mid spar 325*b* can include generally circular openings 340*b*, through which a correspondingly shaped portion of the duct 117 can pass (see, e.g., FIGS. 3B and 4), and in which the circular fan 355 may be located. With reference to FIG. 9C, the aft-mid spar 325c can include rounded rectangular, oblong, or otherwise suitably shaped openings 340c, through which a correspondingly shaped portion of the duct 117 can pass (see, e.g., FIGS. 3B and 4). FIG. 9C also shows the supports 430 for the motor 425 (see FIG. 4), which can extend across the openings 340c as cross-bracing, forming a truss structure to support the motor 425. In some embodiments, the supports 430 can be implemented independently from (e.g., not connected to, or not adjacent to) a spar. With reference to FIG. 9D, the aft spar 325d can include rounded rectangular, oblong, or otherwise suitably shaped openings 340d, through which a correspondingly shaped portion of the duct 117 can pass (see, e.g., FIGS. 3B and 4).

Accordingly, the cross-sectional shape and/or size of a duct can vary along the length of the duct, for example, from an approximately rectangular shape at the inlet (which can be at the leading portion of the wing), to a circular shape at the fan, and back to a nearly rectangular shape at the nozzle exit (which can be at the trailing portion of the wing). In some embodiments, a vertical thickness of one or more of the spars 325 can be greater than a vertical thickness of spars in the outboard portion 140, which provides a large second moment and facilitates using less material in the spar caps and/or skin to react to a wing bending moment.

Figure 10:
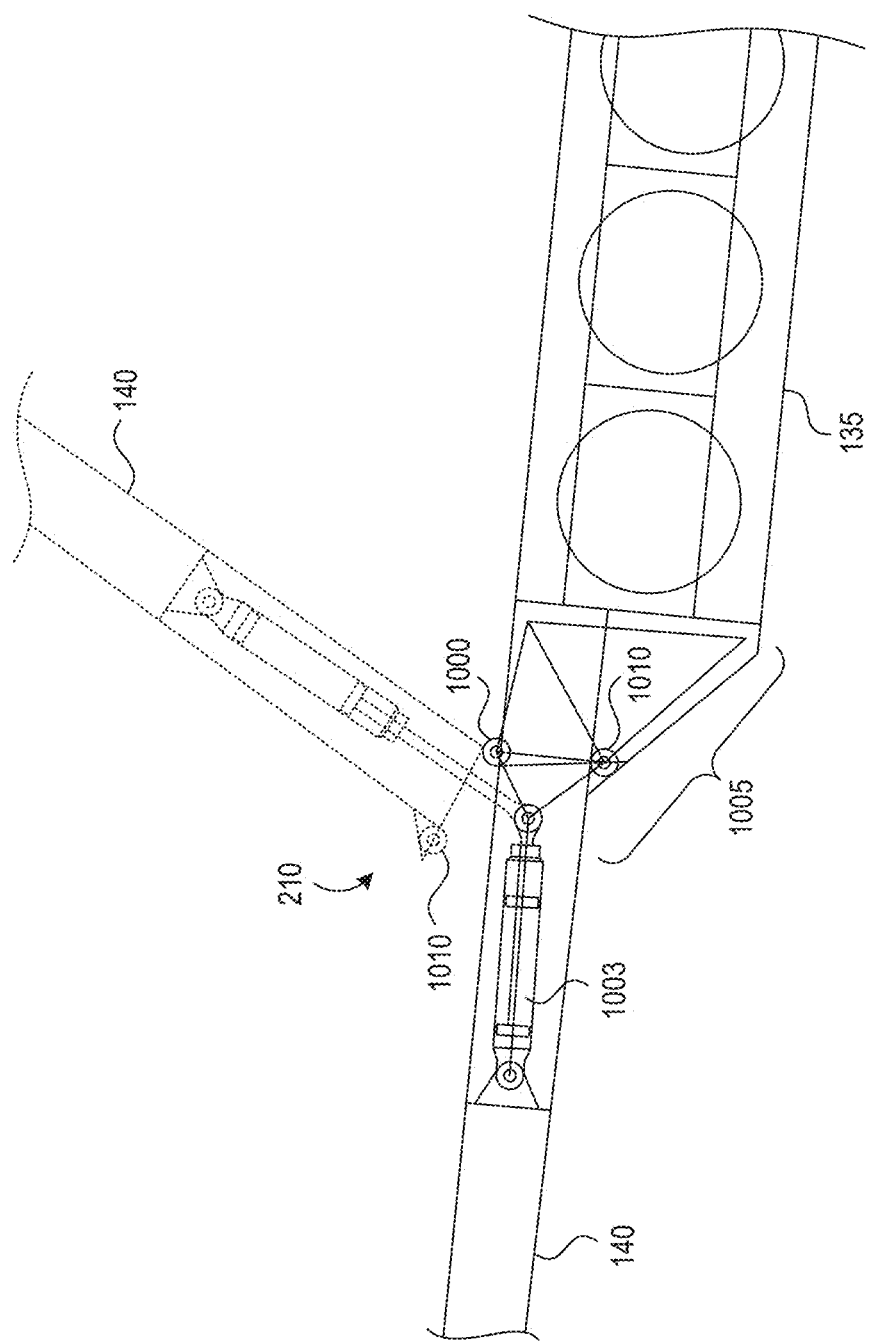
FIG. 10 is a partially schematic front perspective detail view of a wing folding mechanism configured in accordance with embodiments of the present technology.

FIG. 10 is a partially schematic front perspective detail view of the wing folding mechanism 210, configured in accordance with embodiments of the present technology. The wing folding mechanism 210 includes a joint 1000 between the outboard portion 140 and the inboard portion 135. In some embodiments, the wing folding mechanism 210 can include an actuator 1003 (e.g., a hydraulic and/or electric actuator) positioned in the outboard portion 140 that is extendable and retractable to push or pull against the inboard portion 135 to cause rotation of the outboard portion 140 relative to the inboard portion 135 about the joint 1000.

In some embodiments, the joint 1000 can be positioned in a transition region 1005 between the outboard portion 140 and the inboard portion 135. The transition region 1005 can include a smooth transition using a smooth fairing surface between the portions 135, 140, and/or it can include a discrete structure such as a nacelle or another housing for containing the joint 1000. Positioning the joint 1000 in the transition region 1005 can account for concentrated loads that are present due to the change in wing profile between the outboard portion 140 and the inboard portion 135 (which is generally thicker than the outboard portion 140 due to having the propulsion systems 115). The folding mechanism can include a releasable locking mechanism 1010 (e.g., near the bottom wing surface or otherwise opposed to the joint 1000) for locking the wing folding mechanism 210 in a deployed position for aircraft flight. In some embodiments, components of the folding mechanism can be at least partially, mostly, or fully positioned within the volume of the transition portion or the outboard wing portion for a streamlined shape in flight.

Figure 11:
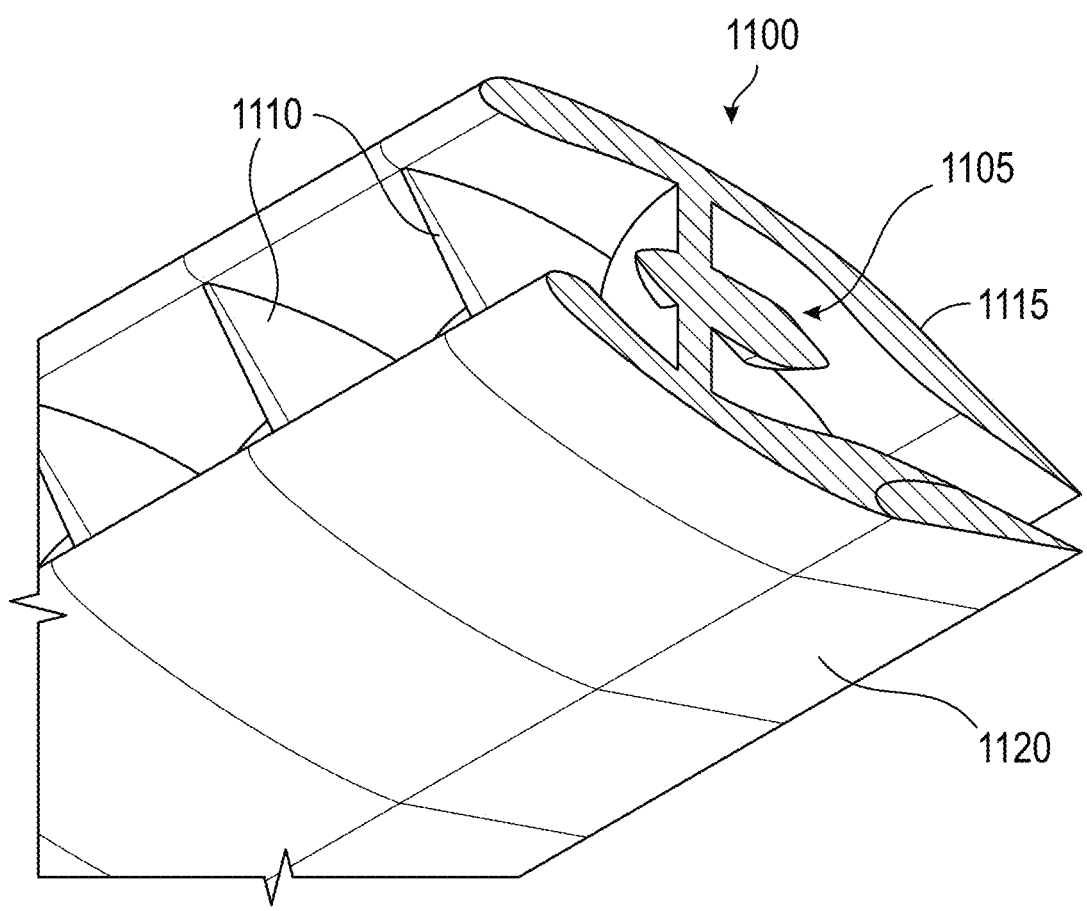
FIG. 11 illustrates a partially schematic lower front perspective view of a portion of a wing assembly configured in accordance with further embodiments of the present technology.

FIG. 11 illustrates a partially schematic lower front perspective view of a portion of a wing assembly 1100 configured in accordance with further embodiments of the present technology, and suitable for implementation in the aircraft 100. The wing assembly 1100 may be generally similar to other wing assemblies disclosed herein, however rather than including discrete ducts containing a propulsion system 1105, the wing assembly 1100 can include vertical splitters 1110 between the propulsion systems 1105, such that independent ducts for the propulsion systems 1105 are formed between the vertical splitters 1110 and between interior surfaces of upper and lower wing portions 1115, 1120. In some embodiments, the vertical splitters 1110 can be load-bearing, such that the structures forming the ducts can serve both structural and aerodynamic functions. In a specific example, the vertical splitters 1110 can be the ribs of the wing assembly 1100.

Aircraft configured in accordance with embodiments of the present technology can include suitable movement mechanisms (e.g., hydraulics, motors, linkages, etc.) to move the movable structures disclosed herein (including leading or trailing edge movable structures). Further suitable movement mechanisms can include morphing materials (e.g., materials including piezoelectric structures).

One feature of several of the embodiments described above with regard to FIGS. 1-11, and with other embodiments configured according to the present disclosure, is that the plurality of propulsion systems in each wing can provide redundancy and resilience against failure of any single propulsion system. For example, relative to a conventional two-engine aircraft, the loss of function of one of many smaller propulsion systems has less of an impact on the force balance on the aircraft, and results in less engine-out trim drag. In addition to providing thrust, engines configured in accordance with embodiments of the present technology can include control of individual engines or groups of engines for yaw and roll functions. The present technology also enables the use of relatively smaller and less complex control surfaces and tails.

A further feature of embodiments of the present technology that implement electric propulsion systems is that the exit flow (which can be characterized as a stream or jet of air) from the electric engines is at near ambient temperature, which allows the wing components (including the materials forming the ducts, nozzles, and movable structures such as flaps) to be made of materials that do not require high temperature resistance. Accordingly, the components may be lighter than conventional aircraft components. A benefit to the lower temperature of the exit stream/flow is that it is not destructive to direct the exit flow at other portions of the aircraft, e.g., the flaps (e.g., a designer does not need to select materials necessary for high temperatures or position the flaps or other surfaces to avoid the exit flow/stream).

A further feature of embodiments of the present technology is that wing assemblies can have an efficient structural design with large spar depth but without the drag penalties of a thick airfoil section, due to the duct and airflow passing through the wing assemblies. Embodiments of the present technology provide reduced weight, drag, and complexity relative to conventional aircraft designs that use combustion jet engines and enables improved performance over other electrically powered aircraft.

A further feature of embodiments of the present technology is that the wing assemblies can provide braking and/or reverse thrust, e.g., by articulating one or more of the movable structures to deflect, cover, or reverse a direction of airflow within or exiting the duct, and/or by opening one or more vents in an upper or lower wing surface to direct the airflow in a forward direction. Alternatively, a rotor rotation direction and/or a pitch direction of a rotor can be reversed to provide reversed thrust and/or braking.

In some embodiments, the electric propulsion systems enable the efficient structure of a wing without necessarily carrying load themselves, and in some embodiments, the propulsion systems can be load-bearing structural components of the wing assemblies. Flap mechanisms at the trailing portion provide high lift for takeoff and landing operations as well as providing a variable nozzle area to control propulsive efficiency and/or aerodynamic stability of the fan. The wing structure and the electric engines provide complementary aerodynamic, structural, and propulsion characteristics. For example, embodiments of the present technology can reduce structural weight and aerodynamic drag while providing sufficient structural characteristics for flight, enabling long distance flight for large aircraft including commercial passenger aircraft.

Embodiments of the present technology can reduce operating and/or maintenance costs relative to conventional aircraft, for example, by 50% (e.g., by facilitating 80% less energy costs). Other aspects of the present technology include minimizing (e.g., eliminating) nacelle and pylon wetted areas, which can reduce profile drag (e.g., by 25% or more) of the aircraft. In some embodiments, the present technology facilitates increased wingspan relative to conventional designs, with reduced (e.g., minimal) structural weight penalty. A large wingspan can reduce the intensity of wingtip vortices and reduce the lift-induced drag. Because the propulsion inlet is shared with the large wing airfoils, the leading edges provide a large radius for the inlet flow. This helps reduce inlet flow distortion at static and low flight speeds, such during a takeoff run. In addition, at high flight speeds where engine flow demand is less than what the inlet could provide, flow spillage drag is negligible. Large leading edge radii can enable high (e.g., 100%) recovery of additive drag through lip suction pressure on the large leading edge radii.

EXAMPLES

The following examples are illustrative of several embodiments of the present technology:

1. An aircraft comprising a fuselage and a wing extending transversely from the fuselage, the wing having a leading portion and a trailing portion positioned opposite the leading portion along a chord of the wing, the wing further comprising:
    an upper wing portion having an upper leading edge, an upper trailing edge, and an upper exterior surface extending between the upper leading edge and the upper trailing edge, the upper exterior surface positioned to face exterior airflow above the wing;
    a lower wing portion having a lower leading edge, a lower trailing edge, and a lower exterior surface extending between the lower leading edge and the lower trailing edge, the lower exterior surface positioned to face exterior airflow below the wing;
    a plurality of independent ducts positioned between the upper wing portion and the lower wing portion, wherein each duct extends between a corresponding inlet positioned toward the leading portion and a corresponding outlet positioned toward the trailing portion;
    a fan positioned in each duct of the plurality of ducts, wherein the fan is rotatable to propel air received in the inlet through the duct and to the outlet; and
    an electric motor operably connected to the fan to rotate the fan.
2. The aircraft of example 1, wherein the wing further comprises one or more movable structures configured to change at least one of a size or a shape of at least one of the inlet or the outlet.
3. The aircraft of any one of the preceding examples, wherein the lower wing portion carries a lower rear control surface, wherein the lower rear control surface is movable relative to the wing to move the lower trailing edge and change a backpressure in the duct.
4. The aircraft of example 3, further comprising a lower intermediate control surface positioned between the lower rear control surface and the lower wing portion, wherein the lower intermediate control surface is spaced apart from the lower rear control surface to form a slotted flap of the wing.
5. The aircraft of any one of the preceding examples, wherein the upper wing portion carries an upper rear control surface, wherein the upper rear control surface is movable relative to the wing to move the upper trailing edge and change a backpressure in the duct.
6. The aircraft of any one of the preceding examples, wherein the upper leading edge is positioned on an upper movable structure, wherein the upper movable structure is movable from a stowed position to a deployed position, and wherein the deployed position comprises the upper movable structure being at least one of rotated relative to the upper wing portion or extended forward of the upper wing portion.
7. The aircraft of any one of the preceding examples, wherein the lower leading edge is positioned on a lower movable structure that is at least one of pivotable relative to the lower wing portion or extendable forward of the lower wing portion.
8. The aircraft of any one of the preceding examples, wherein a cross section of the of the duct varies along a chordwise length of the duct.
9. The aircraft of example 8, wherein the cross section of the duct includes a rounded rectangular shape toward the inlet, a circular shape adjacent to the fan, and a rounded rectangular shape toward the outlet.
10. The aircraft of any one of the preceding examples, wherein the duct diverges from the inlet to the fan, and converges from the fan to the outlet.
11. The aircraft of any one of the preceding examples, wherein the wing comprises a plurality of spars extending laterally along at least part of a span of the wing, and wherein each spar of the plurality of spars comprises a spar web, and wherein each duct extends through an opening in each spar web.
12. The aircraft of any one of the preceding examples, wherein each spar of the plurality of spars extends straight along the span of the wing.
13. The aircraft of any one of the preceding examples, further comprising a plurality of ribs connecting adjacent spars and wing skins.
14. The aircraft of example 11, wherein the plurality of spars comprises a forward spar, a forward-mid spar positioned aft of the forward spar, an aft-mid spar positioned aft of the forward-mid spar, and an aft spar positioned aft of the aft-mid spar.
15. The aircraft of any one of the preceding examples, wherein the electric motor is positioned in the duct.
16. The aircraft of example 15, further comprising a spar web extending along at least part of a span of the wing, wherein the spar web comprises an opening, wherein the duct extends through the opening, and wherein the wing further comprises a plurality of supports connected to the spar web for supporting the electric motor in the duct.
17. The aircraft of any one of the preceding examples, wherein the plurality of ducts are positioned in a first portion of the wing, and wherein the wing comprises a second portion that does not include ducts.

18. The aircraft of any one of the preceding examples, wherein the plurality of ducts are positioned in a first portion of the wing, and wherein the wing comprises a second portion that is rotatable relative to the first portion via a wing folding mechanism.

19. The aircraft of example 18, wherein the first portion is an inboard portion positioned between the fuselage and the second portion.

20. The aircraft of any one of the preceding examples, wherein the wing comprises a plurality of vertical splitter elements extending between the upper wing portion and the lower wing portion, and wherein each vertical splitter element forms a side of an adjacent duct.

21. The aircraft of example 20, wherein the vertical splitter elements are structural ribs of the wing extending between the leading portion and the trailing portion.

22. The aircraft of any one of the preceding examples, wherein the plurality of independent ducts comprises greater than ten independent ducts.

23. The aircraft of example 22, wherein the plurality of independent ducts comprises sixteen independent ducts.

24. An aircraft comprising a fuselage and a wing extending transversely from the fuselage, the wing having a leading portion and a trailing portion positioned opposite the leading portion along a chord of the wing, the wing further comprising:
    an upper wing portion having an upper leading edge, an upper trailing edge, and an upper exterior surface extending between the upper leading edge and the upper trailing edge, the upper exterior surface positioned to face exterior airflow above the wing;
    a lower wing portion having a lower leading edge, a lower trailing edge, and a lower exterior surface extending between the lower leading edge and the lower trailing edge, the lower exterior surface positioned to face exterior airflow below the wing;
    one or more spars extending along at least part of a span of the wing between the upper wing portion and the lower wing portion, wherein each spar of the one or more spars comprises a spar web;
    a plurality of independent ducts positioned between the upper wing portion and the lower wing portion, wherein each duct extends through an opening in at least one of the spar webs between a corresponding inlet positioned toward the leading portion and a corresponding outlet positioned toward the trailing portion;
    a fan positioned in each duct of the plurality of ducts, wherein the fan is rotatable to propel air received in the inlet through the duct and to the outlet; and
    a plurality of electric motors or combustion engines operably connected to each of the fans to rotate the fans.

25. The aircraft of example 24, wherein each spar of the one or more spars extends linearly along the at least part of the span of the wing with uniform thickness along the at least part of the span of the wing.

26. The aircraft of any one of the preceding examples, wherein each electric motor or combustion engine is positioned in a corresponding duct of the plurality of independent ducts.

27. The aircraft of any one of the preceding examples, wherein the wing further comprises one or more movable structures configured to change at least one of a size, shape, or position of at least one of the inlet or the outlet.

28. An aircraft comprising a fuselage and a wing extending transversely from the fuselage, the wing having a leading portion and a trailing portion positioned opposite the leading portion along a chord of the wing, the wing further comprising:
    an upper wing portion extending along at least part of a span of the wing;
    a lower wing portion extending along at least part of the span of the wing;
    a plurality of independent ducts positioned between the upper wing portion and the lower wing portion, each duct extending between an inlet positioned toward a leading portion of the wing and an outlet positioned toward a trailing portion of the wing;
    a fan positioned in each duct of the plurality of ducts, wherein the fan is rotatable to propel air received in the inlet through the duct and to the outlet to create thrust for the aircraft; and
    an aerodynamic control surface carried by the lower wing portion at the trailing portion of the wing;
    wherein:
        the aerodynamic control surface and at least part of the upper wing portion form a nozzle throat for airflow passing through at least one of the ducts; and
        the aerodynamic control surface is movable to change at least one of a size, shape, or position of the nozzle throat.

29. The aircraft of example 28, further comprising a plurality of electric motors, wherein each electric motor of the plurality of electric motors is positioned in one of the ducts of the plurality of ducts and connected to the fan to rotate the fan.

30. The aircraft of any one of the preceding examples, further comprising one or more additional aerodynamic control surfaces carried by the upper wing portion or the lower wing portion.

31. The aircraft of any one of the preceding examples, further comprising a plurality of spars extending along at least a portion of the span of the wing, wherein each duct of the plurality of independent ducts extends through openings in each spar of the plurality of spars.

32. A wing assembly comprising:
    an upper wing portion having an upper leading edge, an upper trailing edge, and an upper exterior surface extending between the upper leading edge and the upper trailing edge, the upper exterior surface positioned to face exterior fluid flow above the wing;
    a lower wing portion having a lower leading edge, a lower trailing edge, and a lower exterior surface extending between the lower leading edge and the lower trailing edge, the lower exterior surface positioned to face exterior fluid flow below the wing;
    a plurality of independent ducts positioned between the upper wing portion and the lower wing portion, wherein each duct extends between a corresponding inlet positioned toward the leading portion and a corresponding outlet positioned toward the trailing portion;
    a fan positioned in each duct of the plurality of ducts, wherein the fan is rotatable to propel fluid received in the inlet through the duct and to the outlet; and
    an electric motor operably connected to the fan to rotate the fan.

33. The wing assembly of example 32, further comprising one or more movable structures configured to change at least one of a size or a shape of at least one of the inlet or the outlet.
34. The wing assembly of any one of the preceding examples, wherein the lower wing portion carries a lower rear control surface, and wherein the lower rear control surface is configured to move the lower trailing edge and change a backpressure in the corresponding duct.
35. The wing assembly of example 34, further comprising a lower intermediate control surface positioned between the lower rear control surface and the lower wing portion, wherein the lower intermediate control surface is spaced apart from the lower rear control surface to form a slotted flap of the wing assembly.
36. The wing assembly of any one of the preceding examples, wherein the upper wing portion carries an upper rear control surface, and wherein the upper rear control surface is configured to move the upper trailing edge and change a backpressure in the corresponding duct.
37. The wing assembly of any one of the preceding examples, wherein the upper leading edge is positioned on an upper movable structure, wherein the upper movable structure is configured to move from a stowed position to a deployed position, and wherein the deployed position comprises the upper movable structure being at least one of rotated relative to the upper wing portion or extended forward of the upper wing portion.
38. The wing assembly of any one of the preceding examples, wherein the lower leading edge is positioned on a lower movable structure that is at least one of pivotable relative to the lower wing portion or extendable forward of the lower wing portion.
39. The wing assembly of any one of the preceding examples, wherein a cross section of the of the duct varies along a chordwise length of the duct.
40. The wing assembly of example 39, wherein the cross section of the individual ducts include a rounded rectangular shape toward the inlet, a circular shape adjacent to the fan, and a rounded rectangular shape toward the outlet.
41. The wing assembly of any one of the preceding examples, wherein the individual ducts diverges from the inlet to the fan and converge from the fan to the outlet.
42. The wing assembly of any one of the preceding examples, further comprising a plurality of spars extending laterally along at least part of a span of the wing assembly, and wherein each spar of the plurality of spars comprises a spar web, and wherein each duct extends through an opening in each spar web.
43. The wing assembly of example 42, wherein each spar of the plurality of spars extends straight along the span of the wing assembly.
44. The wing assembly of example 42, further comprising a plurality of ribs connecting adjacent spars and wing skins.
45. The wing assembly of example 42, wherein the plurality of spars comprises a forward spar, a forward-mid spar positioned aft of the forward spar, an aft-mid spar positioned aft of the forward-mid spar, and an aft spar positioned aft of the aft-mid spar.
46. The wing assembly of any one of the preceding examples, wherein the electric motor is one of the individual ducts.
47. The wing assembly of example 46, further comprising a spar web extending along at least part of a span of the wing assembly, wherein the spar web comprises an opening, wherein the duct extends through the opening, and wherein the wing assembly further comprises a plurality of supports connected to the spar web for supporting the electric motor in the duct.
48. The wing assembly of any one of the preceding examples, wherein the plurality of ducts are positioned in a first portion of the wing, and wherein the wing assembly comprises a second portion that does not include ducts.
49. The wing assembly of any one of the preceding examples, wherein the plurality of ducts are positioned in a first portion of the wing, and wherein the wing assembly further comprises a second portion that is rotatable relative to the first portion via a wing folding mechanism.
50. The wing assembly of any one of the preceding examples, further comprising a plurality of vertical splitter elements extending between the upper wing portion and the lower wing portion, and wherein each vertical splitter element forms a side of an adjacent duct.
51. The wing assembly of example 50, wherein the vertical splitter elements are structural ribs of the wing assembly extending between the leading portion and the trailing portion.
52. The wing assembly of any one of the preceding examples, wherein the plurality of independent ducts comprises greater than ten independent ducts, and wherein the electric motor is one of a plurality of electric motors, each motor being positioned within individual ones of the independent ducts.

CONCLUSION

From the foregoing, it will be appreciated that specific embodiments of the disclosed technology have been described herein for purposes of illustration, but that various modifications may be made without deviating from the technology. For example, in some embodiments, one or more of the movable structures disclosed herein can span multiple (such as all) inlets and/or multiple (such as all) outlets on a wing structure. In some embodiments, a single movable structure can provide the high-lift and nozzle exit area control for one or more (such as all) of the propulsion systems. In some embodiments, each propulsion system can include its own dedicated movable structures that are separately actuatable from the movable structures of other propulsion systems or ducts. In some embodiments, trailing edges can be scalloped and/or otherwise contoured to increase jet mixing and decrease jet noise. Additionally or alternatively, propulsion systems can implement noise damping materials (e.g., in the ducts) to further reduce noise, such as noise from the fan. Several embodiments facilitate improved laminar flow across various surfaces for improved efficiency, e.g., due to slotted flaps or slats. Further embodiments can implement boundary layer suction (e.g., slots or holes in various surfaces leading to lower pressure areas) for additional laminar flow control.

Aircraft configured in accordance with some embodiments of the present technology can include exclusively electrically-powered propulsion. However, in some embodiments, instead of, or in addition to the electrical engines disclosed herein, one or more of the fans within the ducts can be powered by gas-driven turbines. In some embodiments, one or more of the ducts can include a turbojet, turbofan, hybrid electric turbofan, or other suitable propulsion devices within the ducts. Any suitable source of airflow or mechanism for propelling airflow (whether powered by electricity, fuel, or something else) through the ducts can be included in various embodiments. Accordingly, embodiments of the present technology can include multi-ducted wing structures (with a plurality of ducts disclosed herein) with any suitable propulsion in the individual ducts. In some embodiments, each duct can include its own individual propulsion system. In other embodiments, more than one propulsion system can be positioned in a duct.

Embodiments of the present technology can be implemented in any suitable fixed-wing aircraft, including aircraft with low wing sweep (e.g., zero to five degrees). Other embodiments can have higher wing sweep, for example, in a transonic application, aircraft can have wing sweep of 30 to 40 degrees. In supersonic applications, aircraft can have wing sweep of 60 to 70 degrees. In some embodiments, aircraft according to embodiments of the present technology can include negative sweep angle.

Although variation of a nozzle exit area to control rotor backpressure, to control (e.g., maximize or optimize) efficiency, and to avoid rotor stall across various altitude and speed conditions is disclosed herein by moving control surfaces, in some embodiments, the ducts themselves and/or other features of the wing assemblies can vary the nozzle exit area. For example, methods of adjusting a nozzle exit area commonly associated with turbojet and turbofan engines such as translating nozzle plugs, 2D nozzle flaps, and/or petals may be implemented in addition to, or as an alternative to, using the control surfaces as disclosed herein.

Although specific dimensions are provided for context and/or to indicate representative embodiments, various further embodiments can have other sizes or characteristics (for example, sizes commensurate with strength requirements or other variables, such as corrosion and/or heat resistance).

Certain aspects of the technology described in the context of particular embodiments may be combined or eliminated in other embodiments. Further, while advantages associated with certain embodiments of the disclosed technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly shown or described herein.

As used herein, the term "and/or" when used in the phrase "A and/or B" means "A, or B, or both A and B." A similar manner of interpretation applies to the term "and/or" when used in a list of more than two terms. As used herein, the terms "generally" and "approximately" refer to values or characteristics within a range of ±10% from the stated value or characteristic, unless otherwise indicated.

We claim:

1. An aircraft comprising a fuselage and a wing extending transversely from the fuselage, the wing having a leading portion and a trailing portion positioned opposite the leading portion along a chord of the wing, the wing further comprising:
   an upper wing portion having an upper leading edge, an upper trailing edge, and an upper exterior surface extending between the upper leading edge and the upper trailing edge, the upper exterior surface positioned to face exterior airflow above the wing;
   a lower wing portion having a lower leading edge spaced apart from the upper leading edge, a lower trailing edge, and a lower exterior surface extending between the lower leading edge and the lower trailing edge, the lower exterior surface positioned to face exterior airflow below the wing;
   a plurality of spars extending laterally along at least part of a span of the wing wherein each spar of the plurality of spars comprises a spar web;
   a plurality of independent ducts positioned between the upper wing portion and the lower wing portion, wherein each duct extends between a corresponding inlet positioned toward the leading portion and a corresponding outlet positioned toward the trailing portion, and wherein each duct extends through an opening in each spar web;
   a fan positioned in each duct of the plurality of ducts, wherein the fan is rotatable to propel air received in the inlet through the duct and to the outlet; and
   an electric motor operably connected to each fan to rotate the fan.

2. The aircraft of claim 1, wherein, for each duct of the plurality of ducts, the wing further comprises one or more movable structures configured to change at least one of a size or a shape of at least one of the inlet or the outlet.

3. The aircraft of claim 1, wherein the lower wing portion carries a lower rear control surface, wherein the lower rear control surface is movable relative to the wing to move the lower trailing edge and change a backpressure in each duct of the plurality of ducts.

4. The aircraft of claim 3, further comprising a lower intermediate control surface positioned between the lower rear control surface and the lower wing portion, wherein the lower intermediate control surface is spaced apart from the lower rear control surface to form a slotted flap of the wing.

5. The aircraft of claim 1, wherein the upper wing portion carries an upper rear control surface, wherein the upper rear control surface is movable relative to the wing to move the upper trailing edge and change a backpressure in each duct of the plurality of ducts.

6. The aircraft of claim 1, wherein the upper leading edge is positioned on an upper movable structure, wherein the upper movable structure is movable from a stowed position to a deployed position, and wherein the deployed position comprises the upper movable structure being at least one of rotated relative to the upper wing portion or extended forward of the upper wing portion.

7. The aircraft of claim 1, wherein the lower leading edge is positioned on a lower movable structure that is at least one of pivotable relative to the lower wing portion or extendable forward of the lower wing portion.

8. The aircraft of claim 1, wherein, for each duct of the plurality of ducts, a cross section of the duct varies along a chordwise length of the duct.

9. The aircraft of claim 1, wherein for each duct of the plurality of ducts a cross section of the duct includes a rounded rectangular shape toward the inlet, a circular shape adjacent to the fan, and a rounded rectangular shape toward the outlet.

10. The aircraft of claim 1, wherein, for each duct of the plurality of ducts, the duct diverges from the inlet to the fan, and converges from the fan to the outlet.

11. The aircraft of claim 1, wherein each spar of the plurality of spars extends straight along the span of the wing.

12. The aircraft of claim 1, further comprising a plurality of ribs connecting adjacent spars and wing skins.

13. The aircraft of claim 1, wherein the plurality of spars comprises a forward spar, a forward-mid spar positioned aft of the forward spar, an aft-mid spar positioned aft of the forward-mid spar, and an aft spar positioned aft of the aft-mid spar.

14. The aircraft of claim 1, wherein, for each duct of the plurality of ducts, the electric motor operably connected to the fan is positioned in the duct.

15. The aircraft of claim 14, wherein the wing further comprises for each duct of the plurality of ducts, a plurality of supports connected to one of the spar webs for supporting the electric motor in the duct.

16. The aircraft of claim 1, wherein the plurality of ducts are positioned in a first portion of the wing, and wherein the wing comprises a second portion that does not include ducts.

17. The aircraft of claim 1, wherein the plurality of ducts are positioned in a first portion of the wing, and wherein the wing comprises a second portion that is rotatable relative to the first portion via a wing folding mechanism.

18. The aircraft of claim 17, wherein the first portion is an inboard portion positioned between the fuselage and the second portion.

19. The aircraft of claim 1, wherein the wing comprises a plurality of vertical splitter elements extending between the upper wing portion and the lower wing portion, and wherein each vertical splitter element forms a side of an adjacent duct of the plurality of ducts.

20. The aircraft of claim 19, wherein the vertical splitter elements are structural ribs of the wing extending between the leading portion and the trailing portion.

21. The aircraft of claim 1, wherein the plurality of independent ducts comprises greater than ten independent ducts.

22. The aircraft of claim 21, wherein the plurality of independent ducts comprises sixteen independent ducts.

23. The aircraft of claim 1, wherein a portion of the upper exterior surface adjacent to the upper leading edge has a uniformly smooth shape extending between multiple ducts along a spanwise direction.

24. An aircraft comprising a fuselage and a wing extending transversely from the fuselage, the wing having a leading portion and a trailing portion positioned opposite the leading portion along a chord of the wing, the wing further comprising:
an upper wing portion having an upper leading edge, an upper trailing edge, and an upper exterior surface extending between the upper leading edge and the upper trailing edge, the upper exterior surface positioned to face exterior airflow above the wing;
a lower wing portion having a lower leading edge, a lower trailing edge, and a lower exterior surface extending between the lower leading edge and the lower trailing edge, the lower exterior surface positioned to face exterior airflow below the wing;
one or more spars extending along at least part of a span of the wing between the upper wing portion and the lower wing portion, wherein each spar of the one or more spars comprises a spar web;
a plurality of independent ducts positioned between the upper wing portion and the lower wing portion, wherein each duct extends through an opening in at least one of the spar webs between a corresponding inlet positioned toward the leading portion and a corresponding outlet positioned toward the trailing portion, and wherein for each duct of the plurality of ducts,
a cross section of the of the duct varies along a chordwise length of the duct;
a fan positioned in each duct of the plurality of ducts, wherein the fan is rotatable to propel air received in the inlet through the duct and to the outlet; and
for each fan, an electric motor or combustion engine operably connected to the fan to rotate the fan.

25. The aircraft of claim 24, wherein each spar of the one or more spars extends linearly along the at least part of the span of the wing with uniform thickness along the at least part of the span of the wing.

26. The aircraft of claim 24, wherein each electric motor or combustion engine is positioned in a corresponding duct of the plurality of independent ducts.

27. The aircraft of claim 24, wherein the wing further comprises one or more movable structures configured to change at least one of a size, shape, or position of at least one of the inlet or the outlet.

28. The aircraft of claim 24, wherein, for each duct of the plurality of ducts, at least a portion of the duct has a non-circular cross-section.

29. The aircraft of claim 24, wherein, for each duct of the plurality of ducts, at least a portion of the duct forward of a forward-most spar of the one or more spars has a cross-section along a span-wise direction having a straight portion.

30. The aircraft of claim 24, wherein, for each duct of the plurality of ducts, the duct forms a converging-diverging nozzle for air propelled by the fan.

31. An aircraft comprising a fuselage and a wing extending transversely from the fuselage, the wing having a leading portion and a trailing portion positioned opposite the leading portion along a chord of the wing, the wing further comprising:
an upper wing portion extending along at least part of a span of the wing;
a lower wing portion extending along at least part of the span of the wing;
a plurality of spars extending along at least a portion of the span of the wing;
a plurality of independent ducts positioned between the upper wing portion and the lower wing portion, wherein each duct extending-extends between an inlet positioned toward a leading portion of the wing and an outlet positioned toward a trailing portion of the wing, and wherein each duct of the plurality of independent ducts extends through an opening in each spar of the plurality of spars;
a fan positioned in each duct of the plurality of ducts, wherein the fan is positioned between a first spar of the plurality of spars and a second spar of the plurality of spars along a chordwise direction, and wherein the fan is rotatable to propel air received in the inlet through the duct and to the outlet to create thrust for the aircraft; and
an aerodynamic control surface carried by the lower wing portion at the trailing portion of the wing;
wherein:
the aerodynamic control surface and at least part of the upper wing portion form a nozzle throat for airflow passing through at least one of the ducts; and
the aerodynamic control surface is movable to change at least one of a size, shape, or position of the nozzle throat.

32. The aircraft of claim 31, further comprising a plurality of electric motors, wherein each electric motor of the plurality of electric motors is positioned in one of the ducts of the plurality of ducts and connected to the fan to rotate the fan.

33. The aircraft of claim 31, further comprising one or more additional aerodynamic control surfaces carried by the upper wing portion or the lower wing portion.

34. The aircraft of claim 31, wherein, for each duct of the plurality of ducts, the duct comprises a converging portion between a first spar of the plurality of spars and a second spar of the plurality of spars.

35. The aircraft of claim 31, wherein the wing further comprises one or more vertical splitter elements, wherein each vertical splitter element of the one or more vertical splitter elements is positioned between adjacent inlets and extends between the upper wing portion and the lower wing portion.

36. The aircraft of claim 35, wherein the one or more vertical splitter elements are one or more structural ribs of the wing.

37. A wing assembly comprising:
- an upper wing portion having an upper leading edge, an upper trailing edge, and an upper exterior surface extending between the upper leading edge and the upper trailing edge, the upper exterior surface positioned to face exterior fluid flow above the wing;
- a lower wing portion having a lower leading edge spaced apart from the upper leading edge, a lower trailing edge, and a lower exterior surface extending between the lower leading edge and the lower trailing edge, the lower exterior surface positioned to face exterior fluid flow below the wing;
- a plurality of spars extending laterally along at least part of a span of the wing assembly, wherein each spar of the plurality of spars comprises a spar web;
- a plurality of independent ducts positioned between the upper wing portion and the lower wing portion, wherein each duct extends between a corresponding inlet positioned toward the leading portion and a corresponding outlet positioned toward the trailing portion, and through an opening in each spar web;
- a fan positioned in each duct of the plurality of ducts, wherein the fan is rotatable to propel fluid received in the inlet through the duct and to the outlet; and
- an electric motor operably connected to the fan to rotate the fan.

38. The wing assembly of claim 37, further comprising one or more movable structures configured to change at least one of a size or a shape of at least one of the inlets or one of the outlets.

39. The wing assembly of claim 37, wherein the lower wing portion carries a lower rear control surface, and wherein the lower rear control surface is configured to move the lower trailing edge and change a backpressure in at least one of the ducts of the plurality of ducts.

40. The wing assembly of claim 37, wherein the lower wing portion carries a lower rear control surface configured to move the lower trailing edge, and the wing assembly further comprises a lower intermediate control surface positioned between the lower rear control surface and the lower wing portion, wherein the lower intermediate control surface is spaced apart from the lower rear control surface to form a slotted flap of the wing assembly.

41. The wing assembly of claim 37, wherein the upper wing portion carries an upper rear control surface, and wherein the upper rear control surface is configured to move the upper trailing edge and change a backpressure in at least one of the ducts of the plurality of ducts.

42. The wing assembly of claim 37, wherein the upper leading edge is positioned on an upper movable structure, wherein the upper movable structure is configured to move from a stowed position to a deployed position, and wherein the deployed position comprises the upper movable structure being at least one of rotated relative to the upper wing portion or extended forward of the upper wing portion.

43. The wing assembly of claim 37, wherein the lower leading edge is positioned on a lower movable structure that is at least one of pivotable relative to the lower wing portion or extendable forward of the lower wing portion.

44. The wing assembly of claim 37, wherein for each duct of the plurality of ducts, a cross section of the duct varies along a chordwise length of the duct.

45. The wing assembly of claim 44, wherein, for each duct of the plurality of ducts the cross section of the duct includes a rounded rectangular shape toward the inlet, a circular shape adjacent to the fan, and a rounded rectangular shape toward the outlet.

46. The wing assembly of claim 37, wherein for each duct of the plurality of ducts, the duct diverges from the inlet to the fan and converges from the fan to the outlet.

47. The wing assembly of claim 37, wherein each spar of the plurality of spars extends straight along the span of the wing assembly.

48. The wing assembly of claim 37, further comprising a plurality of ribs connecting adjacent spars and wing skins.

49. The wing assembly of claim 37, wherein the plurality of spars comprises a forward spar, a forward-mid spar positioned aft of the forward spar, an aft-mid spar positioned aft of the forward-mid spar, and an aft spar positioned aft of the aft-mid spar.

50. The wing assembly of claim 37, wherein the electric motor is in one of the ducts.

51. The wing assembly of claim 50, wherein the wing assembly further comprises, for each duct of the plurality of ducts, a plurality of supports connected to one of the spar webs for supporting the electric motor in the duct.

52. The wing assembly of claim 37, wherein the plurality of ducts are positioned in a first portion of the wing, and wherein the wing assembly comprises a second portion that does not include ducts.

53. The wing assembly of claim 37, wherein the plurality of ducts are positioned in a first portion of the wing, and wherein the wing assembly further comprises a second portion that is rotatable relative to the first portion via a wing folding mechanism.

54. The wing assembly of claim 37, further comprising a plurality of vertical splitter elements extending between the upper wing portion and the lower wing portion, and wherein each vertical splitter element forms a side of an adjacent duct.

55. The wing assembly of claim 54, wherein the vertical splitter elements are structural ribs of the wing assembly extending between the leading portion and the trailing portion.

56. The wing assembly of claim 37, wherein the plurality of independent ducts comprises greater than ten independent ducts, and wherein the electric motor is one of a plurality of electric motors, each motor being positioned within individual ones of the independent ducts.

\* \* \* \* \*